(12) United States Patent
Shore et al.

(10) Patent No.: US 8,477,764 B2
(45) Date of Patent: *Jul. 2, 2013

(54) METHOD AND SYSTEM FOR A GIGABIT ETHERNET IP TELEPHONE CHIP WITH NO DSP CORE, WHICH USES A RISC CORE WITH INSTRUCTION EXTENSIONS TO SUPPORT VOICE PROCESSING

(75) Inventors: Paul Shore, Whistler (CA); Henry Li, Vancouver (CA); Balwinder Boora, Surrey (CA)

(73) Assignee: Broadcom Corporation, Irvine, CA (US)

( * ) Notice: Subject to any disclaimer, the term of this patent is extended or adjusted under 35 U.S.C. 154(b) by 896 days.

This patent is subject to a terminal disclaimer.

(21) Appl. No.: 12/555,494

(22) Filed: Sep. 8, 2009

(65) Prior Publication Data

US 2010/0020791 A1   Jan. 28, 2010

Related U.S. Application Data

(63) Continuation of application No. 11/151,388, filed on Jun. 13, 2005, now Pat. No. 7,586,904.

(60) Provisional application No. 60/588,140, filed on Jul. 15, 2004.

(51) Int. Cl.
*H04L 12/66* (2006.01)
*H04J 3/16* (2006.01)

(52) U.S. Cl.
USPC .......................................... 370/352; 370/466

(58) Field of Classification Search
None
See application file for complete search history.

(56) References Cited

U.S. PATENT DOCUMENTS

| | | | |
|---|---|---|---|
| 5,778,241 A * | 7/1998 | Bindloss et al. | 712/20 |
| 7,120,143 B1 * | 10/2006 | Martin et al. | 370/356 |
| 2002/0006137 A1 * | 1/2002 | Rabenko et al. | 370/466 |
| 2004/0034760 A1 * | 2/2004 | Paver et al. | 712/221 |
| 2004/0091089 A1 * | 5/2004 | Wynn | 379/93.05 |
| 2004/0165734 A1 * | 8/2004 | Li | 381/86 |
| 2005/0027773 A1 * | 2/2005 | Machnicki et al. | 708/523 |
| 2005/0138582 A1 | 6/2005 | So et al. | |
| 2006/0179273 A1 * | 8/2006 | Cole et al. | 712/34 |
| 2007/0006150 A9 * | 1/2007 | Walmsley | 717/120 |

\* cited by examiner

*Primary Examiner* — Eunsook Choi
(74) *Attorney, Agent, or Firm* — Thomas | Horstemeyer, LLP

(57) ABSTRACT

Methods and systems for processing data are disclosed and may comprise receiving packetized data comprising voice data and network data via an Ethernet switch integrated within a single gigabit Ethernet IP phone chip. The received packetized data may be processed via a single main processor core integrated within the single gigabit Ethernet IP phone chip. The single main processor core may comprise circuitry that is controlled by an instruction set for handling processing of the voice data for a plurality of voice channels without the use of a separate DSP. It may be determined whether data to be processed by the single main processor core is voice data or network data. If the data to be processed by the single main processor core is voice data, at least one modified instruction may be selected from the modified instruction set for processing the voice data.

30 Claims, 6 Drawing Sheets

METHOD AND SYSTEM FOR A GIGABIT ETHERNET IP TELEPHONE CHIP WITH NO DSP CORE, WHICH USES A RISC CORE WITH INSTRUCTION EXTENSIONS TO SUPPORT VOICE PROCESSING

CROSS-REFERENCE TO RELATED APPLICATIONS/INCORPORATION BY REFERENCE

This application makes reference to, claims priority to, and claims the benefit of U.S. application Ser. No. 11/151,388 filed Jun. 13, 2005 which makes reference to, claims priority to, and claims the benefit of U.S. Provisional Application Ser. No. 60/588,140 filed Jul. 15, 2004 and entitled "Method and System for a Gigabit Ethernet IP Telephone Chip."

This application makes reference to:
U.S. application Ser. No. 11/151,138 filed Jun. 13, 2005;
U.S. application Ser. No. 11/151,614 filed Jun. 13, 2005;
U.S. application Ser. No. 11/151,135 filed Jun. 13, 2005; and
U.S. application Ser. No. 11/151,139 filed Jun. 13, 2005.

The above stated applications are hereby incorporated herein by reference in their entirety.

FIELD OF THE INVENTION

Certain embodiments of the invention relate generally to IP telephones. More specifically, certain embodiments of the invention relate to a method and system for a gigabit Ethernet IP telephone chip with no digital signal processing (DSP) core, which uses a reduced instruction set computing (RISC) core with instruction extensions to support voice processing.

BACKGROUND OF THE INVENTION

High-speed digital communication networks over copper and optical fiber are used in many network communication and digital storage applications. Ethernet and Fiber Channel are two widely used communication protocols, which continue to evolve in response to increasing demands for higher bandwidth in digital communication systems.

The Ethernet protocol may provide collision detection and carrier sensing in the physical layer. The physical layer, layer 1, is responsible for handling all electrical, optical, opto-electrical and mechanical requirements for interfacing to the communication media. Notably, the physical layer may facilitate the transfer of electrical signals representing an information bitstream. The physical layer (PHY) may also provide services such as, encoding, decoding, synchronization, clock data recovery, and transmission and reception of bit streams.

As the demand for higher data rates and bandwidth continues to increase, equipment vendors are continuously being forced to employ new design techniques for manufacturing network equipment capable of handling these increased data rates. In response to this demand, the physical layer, or PHY, has been designed to operate at gigabit speeds to keep pace with this demand for higher data rates. These gigabit PHYs are now becoming quite popular in home and office use.

Gigabit Ethernet, which initially found application in gigabit servers, is becoming widespread in personal computers, laptops, and switches, thereby providing the necessary infrastructure for handling data traffic of PCs and packetized telephones. However, network switches, which may be located in a central location within an office, run multiple cable mediums for network and voice data from the switch location to individual office locations, for example. In this regard, multiple cable mediums are now utilized to carry voice and network data. In the alternative, a single cable medium for voice and network data may run from the network switch to individual office locations. However, this scenario is costly as each office location will require a separate switch to route voice data to a telephone and network data to a PC.

Furthermore, existing 10/100 Base Ethernet IP telephones place a bottleneck on the gigabit path between gigabit Ethernet enabled PCs and gigabit Ethernet wiring switches, since the Ethernet IP telephone is not adapted to process data utilizing gigabit speeds. Data may be communicated in gigabit speeds from a gigabit Ethernet switch to the Ethernet IP telephone, but the Ethernet IP telephone may only handle data at speeds lower than one gigabit. In this regard, existing telephones may only process gigabit Ethernet data speeds with an external gigabit Ethernet transceiver which increases connection complexity.

In certain applications, factors such as cost, power budget, and size may play a significant role in the design of a gigabit IP phone and components integrated therein. For example, cost may be a significant factor for some low-end gigabit IP telephones. As a result, some, components in the gigabit phone may be eliminated or cheaper substitutes may have to be utilized. With regard to power budget and size, similar actions may have to be taken.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a gigabit Ethernet IP telephone chip with no digital signal processing (DSP) core, which uses a reduced instruction set computing (RISC) core with instruction extensions to support voice processing, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a gigabit Ethernet IP telephone chip with no digital signal processing (DSP) core, which uses a reduced instruction set computing (RISC) core with instruction extensions to support voice processing. The gigabit Ethernet IP telephone chip may comprise a single processor core having digital signal processing (DSP) functionality. In this regard, the single processor core may be adapted to utilize one or more instructions to execute DSP type functions for processing voice data handle and to execute code for processing voice applications. This may comprise complex voice coding applications, such as G.729AB, G.723.1 and G.722.1, as well as full duplex speakerphone algorithms. One or more instructions for processing voice data may be included within a standard MIPS32 RISC processor core, for example, thereby eliminating the need for a separate on-chip DSP and/or other associated circuitry for handling voice processing functions. The inclusion of the instruction set may reduce the amount of memory and chip real estate that is required for implementing the gigabit Ethernet IP telephone chip with integrated Ethernet switch and single processor core, resulting in reduced manufacturing cost of the gigabit Ethernet IP telephone chip.

The instruction set may comprise a first set of standard MIPS instructions. The instruction set may also comprise a second set of new or modified instructions that are utilized to process voice and/or data. The instruction set may comprise a third set of modified instructions that are used for handling the processing of voice data. For example, the third set of instructions may be utilized to provide DSP type functionality for handling the processing of voice data. This may be utilized in a system in which there is no DSP adapted to handle the processing of voice data.

Figure 1A:
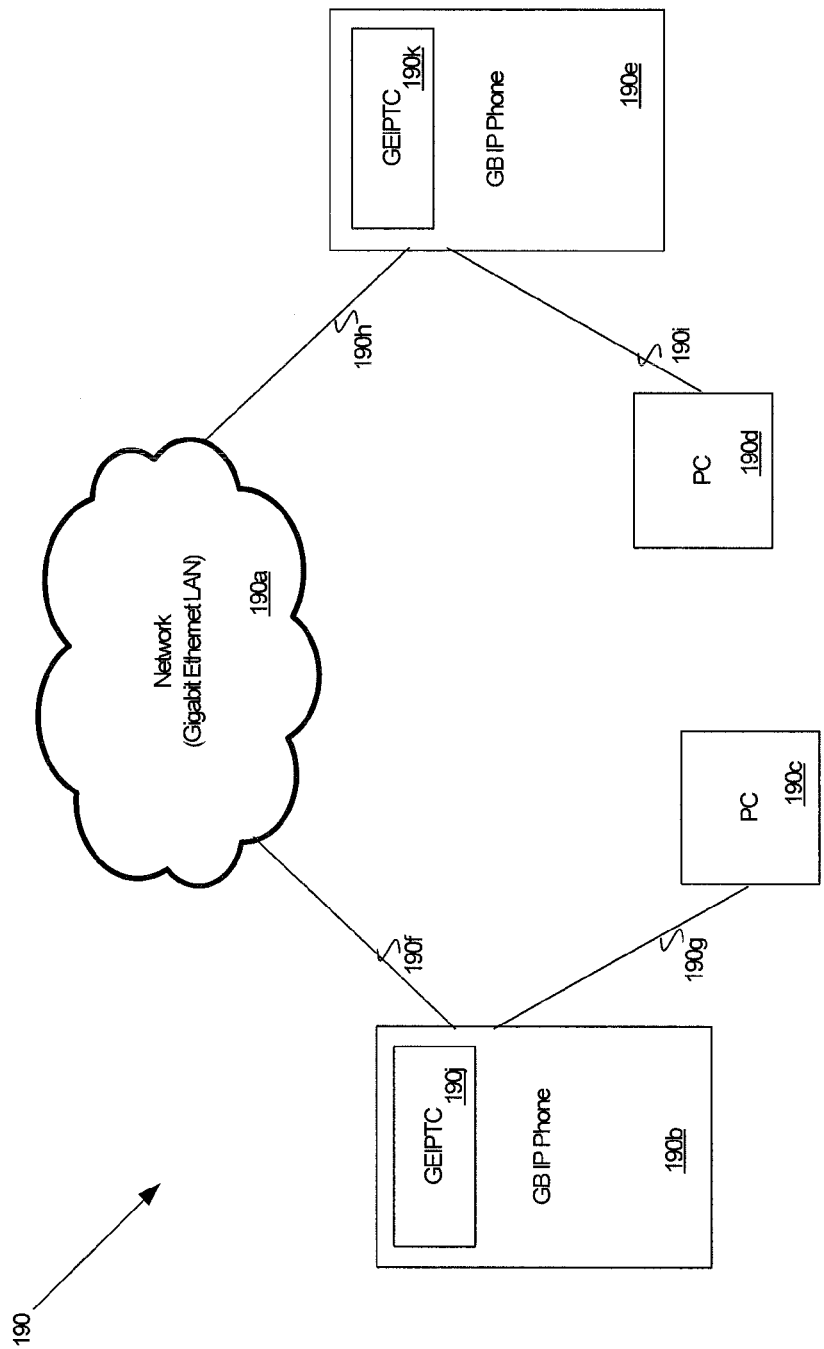
FIG. 1A is an exemplary system comprising gigabit IP telephones coupled to a network, in accordance with an embodiment of the invention.

FIG. 1A is an exemplary system comprising gigabit IP telephones coupled to a network, in accordance with an embodiment of the invention. Referring to FIG. 1A, the network telephone system 190 may comprise gigabit IP telephones 190b and 190e, personal computers (PCs) 190c and 190d, and an network 190a. The PCs 190c and 190d may be gigabit Ethernet enabled PCs. The network may comprise gigabit Ethernet local area network (LAN). The gigabit IP telephones 190b and 190e may each comprise an integrated gigabit Ethernet IP telephone chip with a single processor core (GEIPTC) 190j and 190k, respectively. The GEIPTC 190j and 190k may comprise suitable circuitry, logic, and/or code and may be adapted to support connection between the gigabit IP telephones 190b and 190e, the network 190a, and the PCs 190c and 190d, respectively. In this regard, a single gigabit Ethernet cable medium 190f may connect the network 190a and the gigabit IP telephone 190b and a single gigabit Ethernet medium cable 190g may connect the gigabit IP telephone 190b with the gigabit enabled PC 190c. Similarly, a single gigabit Ethernet cable medium 190h may connect the network 190a and the gigabit IP telephone 190e and a single gigabit Ethernet medium cable 190i may connect the gigabit IP telephone 190e with the gigabit enabled PC 190d.

In operation, voice data may be communicated between gigabit IP telephones 190e and 190b, via Ethernet cable mediums 190h, 190f, and the network 190a. The network 190a may also communicate network data to the gigabit Ethernet enabled PCs 190c and 190d, via Ethernet cable mediums 190f, 190g, 190h, and 190i. In this regard, Ethernet cable mediums 190f and 190h may communicate network data, originating from the network 190a, and voice data, originating from either telephone 190b or telephone 190e. After gigabit IP telephones 190b and 190e receive voice and network data via Ethernet cable mediums 190f and 190h, the GEIPTC 190j and 190k integrated within gigabit IP telephones 190b and 190h may switch the voice data for processing within the telephones 190b and 190h. Furthermore, the GEIPTC 190j and 190k may switch the network data to the PCs 190c and 190d via Ethernet cable mediums 190g and 190i, respectively. A single processor core within the GEIPTC 190j and 190k may be adapted to process voice data utilizing one or more voice processing instructions.

Figure 1B:
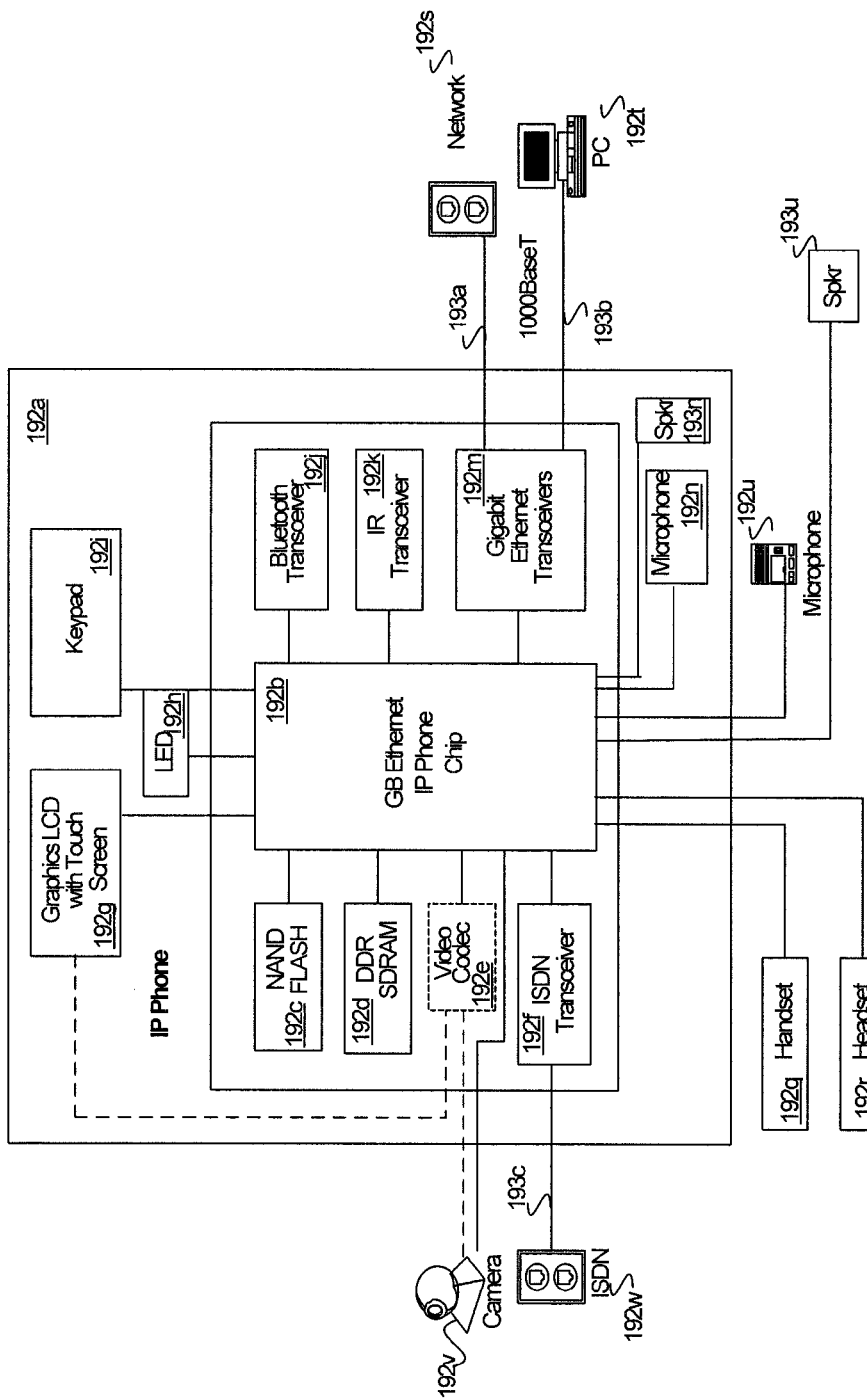
FIG. 1B is a block diagram of an exemplary gigabit Ethernet IP telephone comprising a single integrated gigabit Ethernet IP telephone chip with a single processor core, in accordance with an embodiment of the invention.

FIG. 1B is a block diagram of an exemplary gigabit Ethernet IP telephone comprising a single integrated gigabit Ethernet IP telephone chip with a single processor core, in accordance with an embodiment of the invention. Referring to FIG. 1B, the exemplary gigabit Ethernet IP telephone 192a may comprise a gigabit Ethernet IP telephone chip with a single processor core 192b, a LED 192h, keypad 192i, graphics LCD with touch screen capabilities 192g, NAND Flash memory 192c, double data rate synchronous dynamic random access memory (DDR SDRAM) 192d, an integrated services digital network (ISDN) transceiver 192f, internal microphone 192n, internal speaker 193n, a gigabit Ethernet transceiver (PHY) 192m, an IR transceiver 192k, and a Bluetooth® transceiver 192j.

In one embodiment of the invention, the gigabit Ethernet IP telephone 192a may comprise a video codec block 192e, which may be optional.

In another embodiment of the invention, the gigabit Ethernet IP telephone chip with a single processor core 192b may be adapted to acquire and process voice data from one or more off-chip devices coupled to the gigabit Ethernet IP telephone 192a. Voice data may comprise compressed voice data and voice data control information, for example. For example, voice data may be communicated to the gigabit Ethernet IP telephone 192a from a network, such as a gigabit Ethernet LAN 192s via the Ethernet cable medium 193a and off-chip gigabit Ethernet transceiver (PHY) 192m, or from an ISDN 192w via cable medium 193c and an ISDN transceiver 192f. Voice data may be also communicated to the gigabit Ethernet IP telephone 192a via handset 192g, headset 192r, external speaker 193u, or internal speaker 193n.

In another embodiment of the invention, the gigabit Ethernet IP telephone chip with a single processor core 192b may be adapted to acquire and process network data from one or more off-chip devices coupled to the gigabit Ethernet IP telephone 192a. Network data may comprise all data other than voice data. For example, network data may comprise network communication data and network control data. For example, network data may be received by the gigabit Ethernet IP telephone chip 192b from the network 192s via the Ethernet cable medium 193a and the gigabit PHY 192m. The gigabit Ethernet IP telephone chip 192b may utilize video codec 192e to decode received voice data. Furthermore, video data may be communicated to the gigabit Ethernet IP telephone chip 102b for processing from an external camera 192v coupled to the video codec 192e. Processed data, which may comprise voice and/or video data, may be stored by the gigabit Ethernet IP telephone chip 192b in off-chip memory, such as NAND flash memory 192c and/or DDR SDRAM 192d. Video data may be also displayed by the LCD screen 192g. In one embodiment of the invention, the video codec 192e may be utilized for encoding as well as for providing video conferencing capabilities to the gigabit Ethernet IP telephone 192a. If the gigabit Ethernet IP telephone 192a comprises a video codec 192e, the camera 192v and the LCD 192g may be coupled to the video codec 192e. If the gigabit Ethernet IP telephone 192a does not comprise a video codec 192e, the camera 192v and the LCD 192g may be coupled to the gigabit Ethernet IP telephone chip 192b.

The gigabit Ethernet IP telephone chip with a single processor core 192b may comprise suitable circuitry, logic, and/or code and may be adapted to prioritize and switch voice and/or network data for processing within the gigabit Ethernet IP telephone 192a utilizing a single processor core with a modified instruction set or outside the telephone 192a. For example, voice data may be communicated to the gigabit Ethernet IP telephone chip with a single processor core 192b from the ISDN 192w via the cable medium 193c and the off-chip ISDN transceiver 192f. Network data may be communicated to the gigabit Ethernet IP telephone chip 192b from the network 192s via the Ethernet cable medium 193b and the off-chip gigabit PHY 192m. The gigabit Ethernet IP telephone chip with a single processor core 192b integrated within the gigabit IP telephone 192a may then switch the voice data for processing within the telephone 192a. Voice data may be processed on-chip utilizing a single processor core with instruction set for voice data processing. The network data may be switched to the PC 192t via the off-chip gigabit Ethernet PHY 192m and the Ethernet cable medium 193b. Other data switching scenarios for switching voice and/or network data by the gigabit Ethernet IP telephone chip 192b may also be possible utilizing one or more peripheral device coupled to the gigabit IP telephone 192a, as illustrated in FIG. 1B.

Figure 1C:
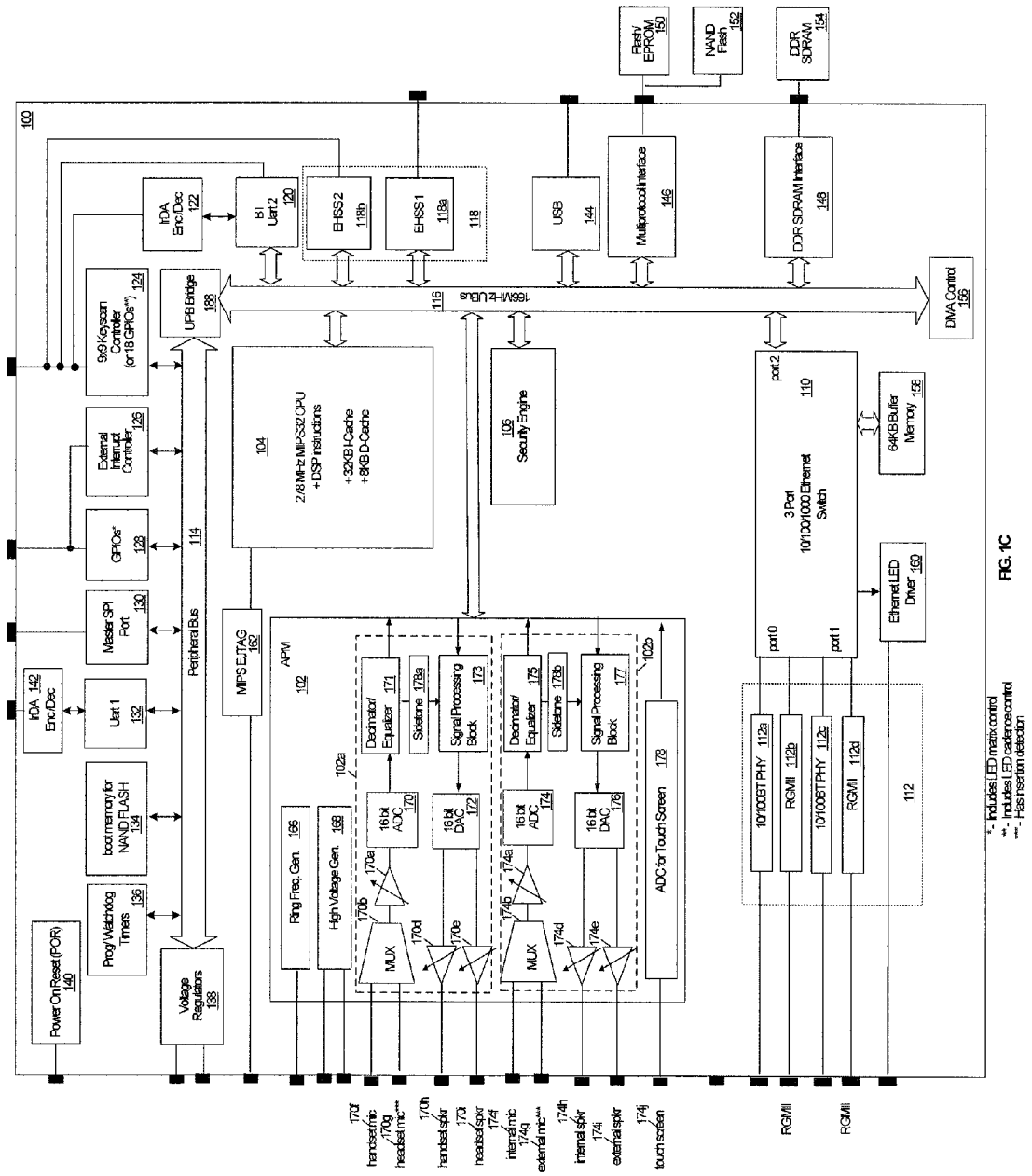
FIG. 1C is a block diagram of a gigabit Ethernet IP telephone chip with a single processor core with modified instruction set for voice processing, in accordance with an embodiment of the invention.

FIG. 1C is a block diagram of a gigabit Ethernet IP telephone chip with a single processor core with modified instruction set for voice processing, in accordance with an embodiment of the invention. Referring to FIG. 1C, the chip 100 may comprise a dual CODEC block 102, a single processor core 104, security engine 106, a multiport Ethernet switch 110, PHY/RGMII interfaces block 112, peripheral bus 114, system bus 116, power on reset (POR) block 140, voltage regulators block 138, DMA controller block 156, memory block 158, Ethernet LED interface 160, Joint Test Action Group (JTAG) port 162, a plurality of system interfaces, and a plurality of peripheral interfaces.

The system interfaces may comprise a Bluetooth interface 120, an Infrared Data Association (IrDA) encoder/decoder block 122, an enhanced high-speed serial (EHSS) port block 118, a universal serial bus (USB) interface block 144, multi-protocol interface block 146, and a memory interface 148. Communication with the system interfaces may occur via the system bus 116. The peripheral interfaces may comprise a keyscan controller block 124, an external interrupt controller block 126, a general purpose input/output (GPIO) block 128, a master serial peripheral interface (SPI) port block 130, a universal asynchronous receiver/transmitter (UART) block 132, an Infrared Data Association (IrDA) encoder/decoder block 142, boot memory block for NAND flash 134, and programmable/watchdog timers block 136. Communication with the peripheral interfaces may occur via the peripheral bus 114. The peripheral bus 114 and the system bus 116 may be coupled via a universal bus to peripheral bus bridge (UPB) 188.

The dual CODEC block 102, the single processor core 104, the security engine 106, the multiport Ethernet switch 110, the DMA controller block 156, the Bluetooth interface 120, the enhanced high-speed serial (EHSS) port block 118, the universal serial bus (USB) interface block 144, the multiprotocol interface block 146, and the DDR SDRAM memory interface 148 may be coupled via the system bus 116. The keyscan controller block 124, the external interrupt controller block 126, the general purpose input/output (GPIO) block 128, the master serial peripheral interface (SPI) port block 130, the universal asynchronous receiver/transmitter (UART) block 132, the Infrared Data Association (IrDA) encoder/decoder block 142, the boot memory block for NAND flash 134, and the programmable/watchdog timers block 136 may be coupled via the peripheral bus 114. Furthermore, the PHY/RGMII interfaces block 112, the memory block 158, and the Ethernet LED interface 160 may be coupled to the multiport Ethernet switch 110.

The dual CODEC block 102 comprises suitable coder/decoder (CODEC) logic, circuitry and/or code that may be adapted to handle compression/decompression of audio signals, such as conversion between analog signals and digital samples at various sample rates. For example, the dual CODEC block 102 may comprise a ring frequency generator block 166, a high voltage generator block 168, CODEC blocks 102a and 102b. The CODEC block 102a may comprise a decimator/equalizer block 171, a sidetone generator block 178a, a signal processing block 173, an interpolating CIC filter 173, an ADC block 170, a digital-to-analog converter (DAC) block 172, a multiplexer 170b, and gain controllers (amplifiers) 170a, 170d and 170e. Similarly, the CODEC block 102b may comprise a decimator/equalizer block 175, a sidetone generator block 178b, a signal processing block 177, an ADC block 174, a digital-to-analog converter (DAC) block 176, a multiplexer 174b, and gain controllers (amplifiers) 174a, 174d and 174e. The decimator/equalizer blocks 171 and 173 may comprise one or more decimating cascaded integrator comb (CIC) filters and/or one or more equalizers. The CIC filters may be adapted to perform resampling from 12.5 MHz, for example, which may be the raw sampling rate of the ADCs 170 and 174 and the DACs 172 and 176.

Also integrated within chip 100 is an ADC 178 that may be adapted to handle touch screen capability. Although the ADC 178 is illustrated as being internal to the dual CODEC block 102, the invention is not so limited. Accordingly, in another embodiment of the invention, the ADC 178 may be located externally to the dual CODEC block 102. The sidetone generator blocks 178a and 178b may comprise one or more Y-filters and may allow sidetone to be added to a receive path of an audio signal.

The CODEC block 102a may be adapted to support a plurality of input and a plurality of output audio sources by way of multiplexing. For example, audio input from a handset microphone 170f and a headset microphone 170g may be multiplexed by the multiplexer 170b and may be utilized as audio inputs to the CODEC block 102a. Audio output signals from the CODEC block 102a may be amplified by amplifiers 170d and 170e before being communicated to a handset speaker 170h and a headset speaker 170i, respectively.

Similarly, the CODEC block 102b may be adapted to support a plurality of input and a plurality of output audio sources by way of multiplexing. For example, audio input from an internal microphone 174f and an external microphone 174g may be multiplexed by the multiplexer 174b and may be utilized as audio inputs to the CODEC block 102b. Audio output signals from the CODEC block 102b may be amplified by amplifiers 174d and 174e before being communicated to an internal speaker 174h and an external speaker 174i, respectively. The ADC 178 may be adapted to convert analog signals received from the touch screen enabled monitor 174j.

The ring frequency generator 166 may comprise suitable circuitry, logic, and/or code and may be adapted to generate a ringing reference waveform. The generated ringing reference waveform may be utilized by one or more serial link and interrupt controllers (SLICs), integrated within the gigabit Ethernet IP telephone chip 100, to drive their high voltage ringing circuitry. The waveform generated by the ring frequency generator 166 may be configurable between sinusoids, trapezoids, and square waves. Frequency, amplitude, and DC offset may also be configurable. In one embodiment of the invention, the ring frequency generator 166 may comprise power down control circuitry.

The high voltage generator 168 may comprise suitable circuitry, logic, and/or code and may be adapted to generate voltages required by an external SLIC, for example, for ringing and battery feed. In one aspect of the invention, the high voltage generator 168 may be adapted to generate a plurality of negative supply voltages, such as −70 and −21 V nominally, which may be required for SLIC operation.

The single processor core 104 may be, for example, a reduced instruction set computer (RISC) processor, such as a million-instructions-per-second (MIPS) processor. The single processor core 104 may comprise suitable logic, circuitry and/or code that may be adapted to handle digital signal processing (DSP) instructions via an instruction set with processing instructions for voice data. An Enhanced Joint Test Action Group (EJTAG) emulator port 162 may be coupled to the single processor core 104 and may be utilized for debugging. The single processor core 104 may be a RISC processor that may be utilized to run operating system code and customer application code, for example. Customer application code may include messaging code, call processing code and web browser code, for example.

The security engine 106 may comprise suitable logic, circuitry, and/or code that may be adapted to handle security functions, such as encryption, decryption and/or authentication. The security engine 106 may comprise a hardware based security module (HSM), not shown in FIG. 1C, which may provide a hardware-ensured secure way to digitally identify a device based on cryptographic algorithms. Secure digital identification within the HSM may be achieved by, for example, embedding the identity or private key information in protected on-chip one-time programmable (OTP) ROM. Private key information may then be used to secure voice and/or data traffic within the gigabit Ethernet IP telephone chip 100. The HSM may also comprise assurance logic, which may be utilized to prevent device tampering and unwanted access to secure information in ROM. A gigabit Ethernet IP telephone chip with integrated security module is described in U.S. application Ser. No. 11/151,614 filed Jun. 13, 2005, which is incorporated herein by reference in its entirety.

The PHY/RGMII interfaces block 112 may comprise reduced gigabit media independent interfaces (RGMII) 112b and 112d, and 10/100 Base Ethernet physical interface transceivers (PHY) 112a and 112c. The RGMII 112b and 112d may comprise suitable circuitry, logic, and/or code and may be adapted to provide an interface between a gigabit media independent interface (GMII) of the multiport Ethernet switch 110 and an external Ethernet PHY. In one embodiment of the invention, the gigabit Ethernet IP telephone chip may utilize a gigabit PHY for receiving and transmitting of packetized data. The gigabit PHY may be implemented off-chip or may be integrated within the gigabit Ethernet IP telephone chip 100. In this regard, the RGMII 112b and 112d may provide an interface between a gigabit media independent interface (GMII) of the multiport Ethernet switch 110 and an external gigabit PHY.

The 10/100 Base PHYs 112a and 112c may comprise suitable circuitry, logic, and/or code and may be adapted to perform physical layer interface functions for 100BASE-TX full-duplex or half-duplex Ethernet on Category 5 cable, and/or 10BASE-T full-duplex or half-duplex Ethernet on Category 3, 4, or 5 cabling within the gigabit Ethernet IP telephone chip 100. For example, the 10/100 Base PHYs 112a and 112c may support 4B5B, MLT3, and Manchester encoding and decoding, clock and data recovery, stream cipher scrambling/descrambling. The 10/100 Base PHYs 112a and 112c may also support digital adaptive equalization, line transmission, carrier sense and link integrity monitor, auto-negotiation, and management.

The multiport Ethernet switch 110 may comprise suitable circuitry, logic, and/or code and may be adapted to switch between one or more ports that route data internally within the gigabit Ethernet IP telephone chip 100 for processing and one or more other ports that route data for off-chip processing. For example, as illustrated in FIG. 1C, the multiport Ethernet switch 110, which may be a 10/100/1000 Ethernet switch, may comprise a plurality of ports, port 0 and port 1, for receiving and transmitting network and/or voice data off-chip via the PHY/RGMII interfaces block 112. The multiport Ethernet switch 110 may also comprise port 2 for routing voice and/or network data internally for processing within the gigabit Ethernet IP telephone chip 100. Port 0 may be coupled to the 10/100 Base PHY 112a and RGMII interface 112b. Port 1 may be coupled to a 10/100 Base PHY 112c and RGMII interface 112d. Port 2 may be coupled to the system bus 116.

The multiport Ethernet switch 110 may utilize memory 158 and an Ethernet LED interface 160. The Ethernet LED interface 160 may comprise suitable circuitry, logic, and/or code and may be utilized to provide visibility of link status, combined transmit and receive activity, duplex mode, and/or port speed for each port within the multiport Ethernet switch 110. The Ethernet LED interface 160 may also provide an indication of the load and/or status of the multiport Ethernet switch 110.

The keyscan controller block 124 may comprise suitable logic, circuitry and/or code that may be adapted to determine when a key is pressed and to identify what key or keys are depressed. In one aspect of the invention, the input and output pins of the keyscan controller block 124 may be configured as general purpose input/output (GPIO) pins. The power on reset (POR) block 140 may comprise suitable logic and/or circuitry that may be adapted to handle power up and reset scenarios. The voltage regulators block 138 may comprise suitable logic and/or circuitry that may be adapted to handle voltage/current regulation within the gigabit Ethernet IP telephone chip 100.

The multiprotocol peripheral interface (MPI) block 146 may comprise suitable logic, circuitry and/or code that may be adapted to handle a plurality of different types of memory. As illustrated in FIG. 1C, flash/EPROM block 150 and NAND flash block 152 may be coupled to the multiprotocol interface block 146. The MPI block 146 may also support other types of memory, such as NOR flash memory, as well as PCI, Mini PCI, CardBus, PCMCIA and expansion bus interface (EBI) devices. In this regard, the gigabit Ethernet IP telephone chip 100 may be adapted support high-speed peripherals, including wireless network adaptors and/or video processors, for example.

The memory interface 148 may be, for example, a double data rate (DDR) SDRAM interface block. As illustrated in FIG. 1C, a DDR SDRAM block 154 may be externally coupled to the DDR SDRAM interface block 148. The memory interface 148 may be utilized to speedily move data on-chip and off-chip for processing. The DMA controller block 156 may be utilized to facilitate DMA transfers between the external SDRAM 154 and external bus interface (EBI) devices coupled to the gigabit Ethernet IP telephone chip 100.

The universal serial bus (USB) interface block 144 may comprise a USB compliant serial bus, which may be, for example, USB1.1, USB2.0, or other USB compliant interface.

The external interrupt controller block 126 may comprise suitable logic, circuitry, and/or code and may be adapted to handle external interrupts. For example, one or more external events may cause the external interrupt controller 126 to generate an interrupt to the single processor core 104.

The GPIO block 128 may comprise a plurality of general-purpose I/O interface pins that may be programmed as input and/or output pins of the gigabit Ethernet IP telephone chip 100. One or more registers within the gigabit Ethernet IP telephone chip 100 may be utilized to program the general-purpose I/O interface pins in the GPIO block 128. The GPIO block 128 may also comprise a LED matrix block, which may be utilized to indicate a status of the GPIO interface pins.

The master SPI port block 130 is a standardized serial peripheral interface (SPI) port and may be utilized for communication with the serial programming interfaces of various devices coupled to the gigabit Ethernet IP telephone chip 100.

The universal asynchronous receiver/transmitter (UART) block 132 may comprise a standard UART port which may be utilized as a debug port. The UART block 132 may be coupled to an Infrared Data Association (IrDA) encoder/decoder block 142 which may support serial infrared (SIR) mode of infrared communication. In this regard, the IrDA encoder/decoder block 142 may support an infrared communication portal between a PC and PDAs or cellular phones utilizing the gigabit Ethernet IP telephone chip 100.

The boot memory block for NAND flash 134 may be adapted to store boot code that controls initialization and setup of the gigabit Ethernet IP telephone chip 100. Other code or parameters may also be stored in the boot memory block for NAND flash 134.

The programmable/watchdog timers block 136 may comprise a plurality of timers such as a watchdog timer. In this regard, a watchdog timer may be included to generate a chip reset if the gigabit Ethernet IP telephone chip 100 is not periodically reset. An interrupt, for example, may be generated after one-half the watchdog count to remind the host to reset the timer.

The Bluetooth interface 120 is Bluetooth compliant and may be coupled to the IrDA encoder/decoder (ENC/DEC) interface block 122. The Bluetooth interface 120 may comprise an UART which may be adapted to support external Bluetooth modules. The Infrared Data Association (IrDA) encoder/decoder block 122 may support serial infrared (SIR) mode of infrared communication.

The enhanced high speed serial (EHSS) port block 118 comprises at least one EHSS interface that is configured to handle serial data. As illustrated in FIG. 1C, the EHSS block 118 may comprise a first EHSS 118a and a second EHSS interface 118b. The EHSS 118a and 118b may provide time division multiplexing (TDM) interface for connecting the gigabit Ethernet IP telephone chip 100 with external CODECs or any external device with a synchronous interface.

The UPB bridge block 188 may comprise suitable circuitry, logic, and/or code and may be adapted to bridge the peripheral bus 114 and the system bus 116. Accordingly, the UPB bridge facilitates communication between devices coupled to the system bus 116 and peripheral devices coupled to the peripheral bus 114.

During an exemplary voice data transmission operating cycle, voice data may be acquired via the microphone ports 170f, 170g, 174f, and 174g of CODEC blocks 102a and 102b within the dual CODEC block 102. Voice data may be initially amplified by the on-board amplifiers 170a and 174a, and then digitized by the ADC blocks 170 and 174 at a high sampling rate, such as 12.5 MHz, for example. The oversampled voice data may be decimated by the CIC (Cascaded-Integrated-Comb) filters within the decimator/equalizer blocks 171 and 175, which may resample the data to an intermediate sampling rate of 100 kHz, for example.

A gain or attenuation may be applied to the resulting 100 kHz sampled signal. The gain-adjusted 100 kHz samples may be further downsampled by an asynchronous sample rate converter (ASRC), not shown in FIG. 1C, to a rate (voiceband) suitable for software digital signal processing, such as 16 kHz. The voiceband samples may be filtered by a programmable equalizer within the decimator/equalizer blocks 171 and 175, which may equalize the transducer response in order to meet telecom specifications. The voice data output of the decimator/equalizer blocks 171 and 175 may be stored in the external SDRAM 154 via the system bus 116 and a DMA control block within the dual CODEC block 102.

The stored voice data may then be communicated to the single processor core 104 for processing. For example, the equalized voice data may be processed by the single processor core 104 utilizing one or more instructions, for example, for processing voice data. After equalized voice data is processed, compressed speech frames may be packetized by the single processor core 104. If security is required, packetized voice data may be communicated to the security module 106 for encryption. During encryption, voice data may be communicated from the single processor core 104 to the security module 106 via the external SDRAM 154. After encryption, encrypted data packets may be further encapsulated by the single processor core 104 with headers suitable for transmission over an IP network.

Encrypted packetized voice data may then be communicated to the multiport Ethernet switch 110 via direct memory access using the external SDRAM 154 and a DMA control block within the Ethernet switch 110. The multiport Ethernet switch 110 may then route the packetized voice data to a network port, such as port 1, for example. The packetized voice data may be converted into signals suitable for transmission over an Ethernet cable medium using the internal 10/100 Base Ethernet PHY 112c or a gigabit Ethernet PHY, not illustrated in FIG. 1C, coupled to the RGMII interface 112d. A gigabit Ethernet PHY may be located, for example, off-chip. The 10/100 Base PHY or the gigabit PHY may then transmit the packetized voice data via an Ethernet network.

During an exemplary voice data reception operating cycle, packetized voice data may be received by the multiport Ethernet switch 110 via an Ethernet cable medium using the internal 10/100 Base Ethernet PHY 112c or a gigabit Ethernet PHY coupled to the RGMII interface 112d of port 1 of the multiport Ethernet switch 110. The multiport Ethernet switch 110 may then route the packetized voice data internally for processing within the gigabit Ethernet IP telephone chip 100 via port 2. For example, the packetized voice data may be stored in the external DDR SDRAM 154 via the system bus 116 and the DMA control block within the Ethernet switch 110.

The stored packetized voice data may then be communicated to the security module 106 for decryption. Decrypted packetized data may be depacketized and decompressed by the single processor core 104. The decompressed voice data may be communicated to the dual CODEC block 102. The decompressed data may be filtered by the CIC filter 173 or 177 within the CODEC blocks 102a or 102b. Filtered voice data may be converted to an analog signal by the DAC converters 172 or 176 and then multiplexed with one or more of the audio signal outputs 170*h*, 170*i*, 174*h*, and 174*i* via the multiplexers 170*c* and 174*c*.

During an exemplary network data transmission operating cycle, network data, such as Ethernet data from a PC, may be received by the multiport Ethernet switch 110 via an Ethernet cable medium using the internal 10/100 Base Ethernet PHY 112*a* or a gigabit Ethernet PHY coupled to the RGMII interface 112*b* of port 0 of the multiport Ethernet switch 110. In one embodiment of the invention, one of the ports of the multiport Ethernet switch 110, such as port 0, may be designated as a PC port and may be utilized during reception and transmission of PC Ethernet data. The 10/100 Base Ethernet PHY 112*a* or the gigabit PHY may convert the PC Ethernet data from analog to digital format. The multiport Ethernet switch 110 may then route the resulting IP packets to a second port, such as port 1, for communicating the packetized PC Ethernet data off-chip. For example, the multiport Ethernet switch 110 may then route the resulting IP packets to the internal 10/100 Base PHY 112*c* of port 1 or to an external gigabit PHY via the RGMII interface 112*d*. The 10/100 Base PHY 112*c* or the gigabit PHY may convert the packetized PC Ethernet data into signals suitable for transmission over Ethernet cable medium. In this regard, the signal may flow through the Ethernet cable medium and into an IP network.

During an exemplary network data reception operating cycle, network data, such as Ethernet data for a PC, may be received by the multiport Ethernet switch 110 via an Ethernet cable medium using the internal 10/100 Base Ethernet PHY 112*c* or a gigabit Ethernet PHY coupled to the RGMII interface 112*d* of port 1 of the multiport Ethernet switch 110. In one embodiment of the invention, one of the ports of the multiport Ethernet switch 110, such as port 0, may be designated as a PC port and may be utilized during reception and transmission of PC Ethernet data. A second port, such as port 1, may be designated as a network port and may be utilized during reception and transmission of packetized data, including voice and network data, from and to an IP network. The 10/100 Base Ethernet PHY 112*d* or the gigabit PHY may convert the network data from analog to digital format. The multiport Ethernet switch 110 may then route the resulting IP packets to a second PC data port, such as port 0, for communicating the packetized network data off-chip to a PC. For example, the multiport Ethernet switch 110 may route the resulting IP packets to the internal 10/100 Base PHY 112*a* of port 0 or to an external gigabit PHY via the RGMII interface 112*b*. The 10/100 Base PHY 112*a* or the gigabit PHY may convert the packetized PC Ethernet data into signals suitable for transmission over Ethernet cable medium. In this regard, the signal may flow through the Ethernet cable medium and off-chip to a PC for processing.

In accordance with an embodiment of the invention, the single processor core 104 may utilize one or more instructions to execute DSP type functions for processing voice data. In this regard, the single processor core 104 may utilize an instruction set of processing instructions. The instruction set may comprise one or more modified instructions or RISC extensions for processing voice data. Furthermore, the instruction set may comprise one or more unmodified RISC instructions for processing voice data. The single processor core 104 may be also adapted to execute speech compression algorithms for one or more of a plurality of protocols or standards.

Figure 2:
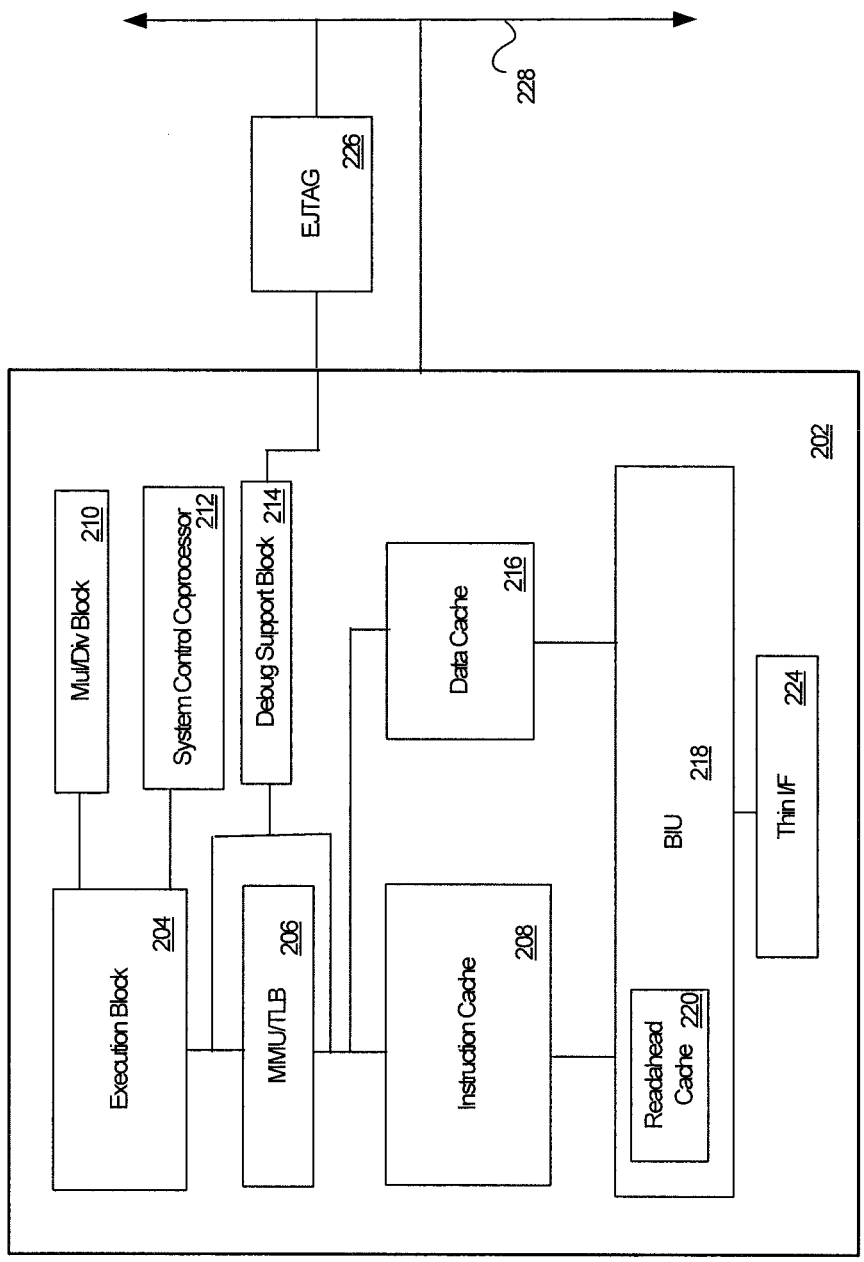
FIG. 2 is a block diagram of an exemplary processor core with modified instruction set for voice processing, in accordance with an embodiment of the invention.

FIG. 2 is a block diagram of an exemplary processor core with modified instruction set for voice processing, in accordance with an embodiment of the invention. Referring to FIG. 2, the processor core 202 may comprise an execution block 204, a multiply/divide block 210, a system control coprocessor (SCC) 212, a debug support block 214, a memory management unit (MMU) with a translation lookaside buffer (TLB) 206, an instruction cache 208, a data cache 216, a bus interface unit (BIU) 218, and a thin interface block 224. The BIU 218 may comprise readahead cache 220 and a write buffer. In one aspect of the invention, the processor core 202 may utilize an instruction set with a plurality of modified and/or unmodified instructions for digital signal processing of voice data, for example. In this regard, the core processor 202 may be utilized in connection with, for example, the single gigabit Ethernet IP telephone chip 100 (FIG. 1C), which is integrated within a gigabit Ethernet IP telephone.

The execution block 204 may comprise suitable circuitry, logic, and/or code and may be adapted to execute one or more modified or unmodified instructions for processing data, such as voice data, for example. The execution block 204 may utilize load-store architecture with, for example, an Arithmetic Logic Unit (ALU), not pictured in FIG. 2, for logical, shift, add, and subtract operations. The execution block 204 may utilize the multiply/divide block 210 during execution of arithmetic operations. Furthermore, the execution block 204 may comprise thirty-two 32-bit general-purpose registers which may be utilized for scalar integer operations and address calculation. In one embodiment of the invention, the register file within the execution block 204 may be fully bypassed to minimize latency in the data processing pipeline. The execution block 204 may further comprise a 32-bit adder used for calculating data addresses, a MIPS32 instruction decoding unit for decoding one or more modified or unmodified instruction for processing voice data, and/or a branch unit for branch resolution and next instruction calculation (not illustrated in FIG. 2).

The multiply/divide block (MDB) 210 may comprise suitable circuitry, logic, and/or code and may be adapted to perform multiply, divide operations, and/or other arithmetic operations in accordance with one or more modified or unmodified core processor instructions. The multiply/divide block 210 may comprise a 32×32 pipeline multiplier, HI and LO result-accumulation registers, a divide state machine, and one or more multiplexers and control logic that may be required to perform data calculations. The MDB 210 may be adapted to support execution of a 32×32 multiply operation third clock cycle. In this regard, interlocks may be implemented within the MDB 210 to stop issuing back-to-back 32×32 multiply operations. Divide operations may be performed by the MDB 210 with a 2-bit radix iterative algorithm, for example.

In one embodiment of the invention, the MDB 210 may implement a modified instruction set comprising a plurality of unmodified instructions. The unmodified instructions may be utilized during digital signal processing of voice data by the core processor 202.

The modified instruction set implemented within the MDB 210 may comprise a multiply and accumulate to a MIPS hi/lo register pair (MADDSLL) unmodified instruction. The format of the instruction may be "MADDSLL rs, rt," where rs and rt may be registers within the execution block 204. The low 16 bits of rs and the low 16 bits of rt may be used for the multiplication. A left shift may be performed on the result of the multiplication before adding to the hi/lo pair. Furthermore, if the result of the multiplication is 0x40000000, the result of the left shift may be saturated to 0x7fffffff. If overflow or underflow occurs when adding the shifted multiplication result to the hi/lo pair, then the result may be saturated to the maximum or minimum signed 32-bit integer value, 0x7fffffff or 0xffffffff80000000. The sticky overflow bit may be set on any case of overflow or underflow. The following pseudo code may be utilized to implement the MADDSLL instruction within the core processor 202:

```
/* temp is 32 bits */
/* hilo is 64 bits */
temp = rs.lo * rt.lo;
if ( temp == 0x40000000 )
{
   temp = 0x7fffffff;
   OVF = 1;
}
else
{
   temp = temp << 1;
}
hilo = hilo + temp;
if ( hilo > 0x7fffffff )
{
   hilo = 0x7fffffff;
   OVF = 1;
}
else if ( hilo < 0xffffffff80000000 )
{
   hilo = 0xffffffff80000000;
   OVF = 1;
}
```

The modified instruction set implemented within the MDB 210 may also comprise a multiply and accumulate to a MIPS hi/lo register pair (MADDSLH) unmodified instruction. The format of the instruction may be "MADDSLH rs, rt," where rs and rt may be MIPS registers within the core processor 202. The low 16 bits of rs and the high 16 bits of rt may be used for the multiplication. A left shift may be performed on the result of the multiplication before adding to the hi/lo register pair. Furthermore, if the result of the multiplication is 0x40000000, the result of the left shift may be saturated to 0x7fffffff. If overflow or underflow occurs when adding the shifted multiplication result to the hi/lo pair, then the result may be saturated to the maximum or minimum signed 32-bit integer value, 0x7fffffff or 0xffffffff80000000. The sticky overflow bit may be set on any case of overflow or underflow. The following pseudo code may be utilized to implement the MADDSLH instruction within the core processor 202:

```
/* temp is 32 bits */
/* hilo is 64 bits */
temp = rs.lo * rt.hi;
if ( temp == 0x40000000 )
{
   temp = 0x7fffffff;
   OVF = 1;
}
else
{
   temp = temp << 1;
}
hilo = hilo + temp;
if ( hilo > 0x7fffffff )
{
   hilo = 0x7fffffff;
   OVF = 1;
}
else if ( hilo < 0xffffffff80000000 )
{
   hilo = 0xffffffff80000000;
   OVF = 1;
}
```

The modified instruction set implemented within the MDB 210 may also comprise a multiply and accumulate to a MIPS hi/lo register pair (MADDSHL) unmodified instruction. The format of the instruction may be "MADDSHL rs, rt," where rs and rt may be MIPS registers within the core processor 202. The high 16 bits of rs and the low 16 bits of rt may be used for the multiplication. A left shift may be performed on the result of the multiplication before adding to the hi/lo pair. Furthermore, if the result of the multiplication is 0x40000000, the result of the left shift may be saturated to 0x7fffffff. If overflow or underflow occurs when adding the shifted multiplication result to the hi/lo pair, then the result may be saturated to the maximum or minimum signed 32-bit integer value (0x7fffffff or 0xffffffff80000000). The sticky overflow may be set on any case of overflow or underflow. The following pseudo code may be utilized to implement the MADDSHL instruction within the core processor 202:

```
/* temp is 32 bits */
/* hilo is 64 bits */
temp = rs.hi * rt.lo;
if ( temp == 0x40000000 )
{
   temp = 0x7fffffff;
   OVF = 1;
}
else
{
   temp = temp << 1;
}
hilo = hilo + temp;
if ( hilo > 0x7fffffff )
{
   hilo = 0x7fffffff;
   OVF = 1;
}
else if ( hilo < 0xffffffff80000000 )
{
   hilo = 0xffffffff80000000;
   OVF = 1;
}
```

The modified instruction set implemented within the MDB 210 may comprise a multiply and accumulate to a MIPS hi/lo register pair (MADDSHH) unmodified instruction. The format of the instruction may be "MADDSHH rs, rt," where rs and rt may be MIPS registers within the core processor 202. The high 16 bits of rs and the high 16 bits of rt may be used for the multiplication. A left shift may be performed on the result of the multiplication before adding to the hi/lo pair. Furthermore, if the result of the multiplication is 0x40000000, the result of the left shift may be saturated to 0x7fffffff. If overflow or underflow occurs when adding the shifted multiplication result to the hi/lo pair, then the result may be saturated to the maximum or minimum signed 32-bit integer value (0x7fffffff or 0xffffffff80000000). The sticky overflow bit may be set on any case of overflow or underflow. The following pseudo code may be utilized to implement the MADDSHL instruction within the core processor 202:

```
/* temp is 32 bits */
/* hilo is 64 bits */
temp = rs.hi * rt.hi;
if ( temp == 0x40000000 )
{
   temp = 0x7fffffff;
   OVF = 1;
}
else
{
```

```
      temp = temp << 1;
    }
    hilo = hilo + temp;
    if ( hilo > 0x7fffffff )
    {
      hilo = 0x7fffffff;
      OVF = 1;
    }
    else if ( hilo < 0xffffffff80000000 )
    {
      hilo = 0xffffffff80000000;
      OVF = 1;
    }
```

The modified instruction set implemented within the MDB 210 may comprise a multiply and accumulate to a MIPS hi/lo register pair (MADDLL) unmodified instruction. The format of the instruction may be "MADDLL rs, rt," where rs and rt may be MIPS registers within the core processor 202. The low 16 bits of rs and the low 16 bits of rt may be used for the multiplication, without left shifting of the product before the accumulation and without saturating an overflow logic. The following pseudo code may be utilized to implement the MADDLL instruction within the core processor 202:

```
/* hilo is 64 bits */
hilo = hilo + rs.lo * rt.lo;
```

The modified instruction set implemented within the MDB 210 may comprise a multiply and accumulate to a MIPS hi/lo register pair (MADDLH) unmodified instruction. The format of the instruction may be "MADDLH rs, rt," where rs and rt may be MIPS registers within the core processor 202. The low 16 bits of rs and the high 16 bits of rt may be used for the multiplication, without left shifting of the product before the accumulation and without saturating an overflow logic. The following pseudo code may be utilized to implement the MADDLH instruction within the core processor 202:

```
/* hilo is 64 bits */
hilo = hilo + rs.lo * rt.hi;
```

The modified instruction set implemented within the MDB 210 may comprise a multiply and accumulate to a MIPS hi/lo register pair (MADDHL) unmodified instruction. The format of the instruction may be "MADDHL rs, rt," where rs and rt may be MIPS registers within the core processor 202. The high 16 bits of rs and the low 16 bits of rt may be used for the multiplication, without a left shift of the product before the accumulation and without saturation on overflow logic, for example. The following pseudo code may be utilized to implement the MADDHL instruction within the core processor 202:

```
/* hilo is 64 bits */
hilo = hilo + rs.hi * rt.lo;
```

The modified instruction set implemented within the MDB 210 may comprise a multiply and accumulate to a MIPS hi/lo register pair (MADDHH) unmodified instruction. The format of the instruction may be "MADDHH rs, rt," where rs and rt may be MIPS registers within the core processor 202. The high 16 bits of rs and the high 16 bits of rt may be used for the multiplication, without a left shift of the product before the accumulation and without saturation on overflow logic, for example. The following pseudo code may be utilized to implement the MADDHH instruction within the core processor 202:

```
/* hilo is 64 bits */
hilo = hilo + rs.hi * rt.hi;
```

The modified instruction set implemented within the MDB 210 may comprise a multiply and subtract from the MIPS hi/lo register pair (MSUBSLL) unmodified instruction. The format of the instruction may be "MSUBSLL rs, rt," where rs and rt may be MIPS registers within the core processor 202. The low 16 bits of rs and the low 16 bits of rt may be used for the multiplication. A left shift is performed on the result of the multiplication before subtracting from the hi/lo pair. Furthermore, if the result of the multiplication is 0x40000000, the result of the left shift may be saturated to 0x7fffffff. If overflow or underflow occurs when subtracting the shifted multiplication result from the hi/lo pair, then the result may be saturated to the maximum or minimum signed 32-bit integer value (0x7fffffff or 0xffffffff80000000). The sticky overflow bit may be set on any case of overflow or underflow. The following pseudo code may be utilized to implement the MSUBSLL instruction within the core processor 202:

```
/* temp is 32 bits */
/* hilo is 64 bits */
temp = rs.lo * rt.lo;
if ( temp == 0x40000000 )
{
  temp = 0x7fffffff;
  OVF = 1;
}
else
{
  temp = temp << 1;
}
hilo = hilo - temp;
if ( hilo > 0x7fffffff )
{
  hilo = 0x7fffffff;
  OVF = 1;
}
else if ( hilo < 0xffffffff80000000 )
{
  hilo = 0xffffffff80000000;
  OVF = 1;
}
```

The modified instruction set implemented within the MDB 210 may comprise a multiply and subtract from a MIPS hi/lo register pair (MSUBSLH) unmodified instruction. The format of the instruction may be "MSUBSLH rs, rt," where rs and rt may be MIPS registers within the core processor 202. The low 16 bits of rs and the high 16 bits of rt may be used for the multiplication. A left shift may be performed on the result of the multiplication before subtracting from the hi/lo pair. Furthermore, if the result of the multiplication is 0x40000000, the result of the left shift may be saturated to 0x7fffffff. If overflow or underflow occurs when subtracting the shifted multiplication result from the hi/lo pair, then the result may be saturated to the maximum or minimum signed 32-bit integer value (0x7fffffff or 0xffffffff80000000). The sticky overflow bit may be set on any case of overflow or underflow. The following pseudo code may be utilized to implement the MSUBSLH instruction within the core processor 202:

```
/* temp is 32 bits */
/* hilo is 64 bits */
temp = rs.lo * rt.hi;
if ( temp == 0x40000000 )
{
    temp = 0x7fffffff;
    OVF = 1;
}
else
{
    temp = temp << 1;
}
hilo = hilo - temp;
if ( hilo > 0x7fffffff )
{
    hilo = 0x7fffffff;
    OVF = 1;
}
else if ( hilo < 0xffffffff80000000 )
{
    hilo = 0xffffffff80000000;
    OVF = 1;
}
```

The modified instruction set implemented within the MDB 210 may comprise a multiply and subtract from a MIPS hi/lo register pair (BSHL) unmodified instruction. The format of the instruction may be "BSHL rs, rt," where rs and rt may be MIPS registers within the core processor 202. The high 16 bits of rs and the low 16 bits of rt are used for the multiplication. A left shift may be performed on the result of the multiplication before subtracting from the hi/lo pair. Furthermore, if the result of the multiplication is 0x40000000, the result of the left shift may be saturated to 0x7fffffff. If overflow or underflow occurs when subtracting the shifted multiplication result from the hi/lo pair, then the result is saturated to the maximum or minimum signed 32-bit integer value (0x7fffffff or 0xffffffff80000000). The sticky overflow bit may be set on any case of overflow or underflow. The following pseudo code may be utilized to implement the BSHL instruction within the core processor 202:

```
/* temp is 32 bits */
/* hilo is 64 bits */
temp = rs.hi * rt.lo;
if ( temp == 0x40000000 )
{
    temp = 0x7fffffff;
    OVF = 1;
}
else
{
    temp = temp << 1;
}
hilo = hilo - temp;
if ( hilo > 0x7fffffff )
{
    hilo = 0x7fffffff;
    OVF = 1;
}
else if ( hilo < 0xffffffff80000000 )
{
    hilo = 0xffffffff80000000;
    OVF = 1;
}
```

The modified instruction set implemented within the MDB 210 may comprise a multiply and subtract from a MIPS hi/lo register pair (MSUBSHH) unmodified instruction. The format of the instruction may be "MSUBSHH rs, rt," where rs and rt may be MIPS registers within the core processor 202. The high 16 bits of rs and the high 16 bits of rt may be used in the multiplication. A left shift is performed on the result of the multiplication before subtracting from the hi/lo pair. Furthermore, the result of the left shift is saturated to 0x7fffffff if the result of the multiplication is 0x40000000. If overflow or underflow occurs when subtracting the shifted multiplication result from the hi/lo pair, then the result is saturated to the maximum or minimum signed 32-bit integer value (0x7fffffff or 0xffffffff80000000). The sticky overflow bit is set on any case of overflow or underflow. The following pseudo code may be utilized to implement the MSUBSHH instruction within the core processor 202:

```
/* temp is 32 bits */
/* hilo is 64 bits */
temp = rs.hi * rt.hi;
if ( temp == 0x40000000 )
{
    temp = 0x7fffffff;
    OVF = 1;
}
else
{
    temp = temp << 1;
}
hilo = hilo - temp;
if ( hilo > 0x7fffffff )
{
    hilo = 0x7fffffff;
    OVF = 1;
}
else if ( hilo < 0xffffffff80000000 )
{
    hilo = 0xffffffff80000000;
    OVF = 1;
}
```

The modified instruction set implemented within the MDB 210 may comprise a multiply and subtract from a MIPS hi/lo register pair (MSUBLL) unmodified instruction. The format of the instruction may be "MSUBLL rs, rt," where rs and rt may be MIPS registers within the core processor 202. The low 16 bits of rs and the low 16 bits of rt may be used for the multiplication, without a left shift of the product before the subtraction and without saturation on overflow logic may; for example. The following pseudo code may be utilized to implement the MSUBLL instruction within the core processor 202:

```
/* hilo is 64 bits */
hilo = hilo - rs.lo * rt.lo;
```

The modified instruction set implemented within the MDB 210 may comprise a multiply and subtract from a MIPS hi/lo register pair (MSUBLL) unmodified instruction. The format of the instruction may be "MSUBLH rs, rt," where rs and rt may be MIPS registers within the core processor 202. The low 16 bits of rs and the high 16 bits of rt may be used for the multiplication, without a left shift of the product before the subtraction and without saturation on overflow logic may; for example. The following pseudo code may be utilized to implement the MSUBLL instruction within the core processor 202:

```
/* hilo is 64 bits */
hilo = hilo – rs.lo * rt.hi;
```

The modified instruction set implemented within the MDB 210 may comprise a multiply and subtract from a MIPS hi/lo register pair (MSUBHL) unmodified instruction. The format of the instruction may be "MSUBHL rs, rt," where rs and rt may be MIPS registers within the core processor 202. The high 16 bits of rs and the low 16 bits of rt may be used for the multiplication, without a left shift of the product before the subtraction and without saturation on overflow logic, for example. The following pseudo code may be utilized to implement the MSUBHL instruction within the core processor 202:

```
/* hilo is 64 bits */
hilo = hilo – rs.hi * rt.lo;
```

The modified instruction set implemented within the MDB 210 may comprise a multiply and subtract from a MIPS hi/lo register pair (MSUBHH) unmodified instruction. The format of the instruction may be "MSUBHH rs, rt," where rs and rt may be MIPS registers within the core processor 202. The high 16 bits of rs and the high 16 bits of rt may be used for the multiplication, without a left shift of the product before the subtraction and without saturation on overflow logic, for example. The following pseudo code may be utilized to implement the MSUBHH instruction within the core processor 202:

```
/* hilo is 64 bits */
hilo = hilo – rs.hi * rt.hi;
```

The modified instruction set implemented within the MDB 210 may comprise adding the 32-bit value in register rs to the 32-bit value in a MIPS hi/lo register pair (ADDS) unmodified instruction. The format of the instruction may be "ADDS rd, rs, rt," where rd, rs and rt may be MIPS registers within the core processor 202. If overflow occurs, the result may be saturated to the maximum 32-bit integer 0x7fffffff. If underflow occurs, the result may be saturated to the minimum 32-bit integer 0x80000000. The sticky overflow bit may be set on any case of overflow or underflow. The following pseudo code may be utilized to implement the ADDS instruction within the core processor 202:

```
/* temp is more than 32 bits */
temp = rs + rt;
if ( temp > 0x7fffffff )
{
  rd = 0x7fffffff;
  OVF = 1;
}
else if ( temp < 0xffffffff80000000 )
{
  rd = 0x80000000;
  OVF = 1;
}
else
{
  rd = temp;
}
```

The modified instruction set implemented within the MDB 210 may comprise subtracting the 32-bit value in register rt from the 32-bit value in a MIPSS register rs (SUBS) unmodified instruction. The format of the instruction may be "SUBS rd, rs, rt", where rd, rs and rt may be MIPS registers within the core processor 202. If overflow occurs, the result may be saturated to the maximum 32-bit integer 0x7fffffff. If underflow occurs, the result may be saturated to the minimum 32-bit integer 0x80000000. The sticky overflow bit may be set on any case of overflow or underflow. The following pseudo code may be utilized to implement the SUBS instruction within the core processor 202:

```
/* temp is more than 32 bits */
temp = rs – rt;
if ( temp > 0x7fffffff )
{
  rd = 0x7fffffff;
  OVF = 1;
}
else if ( temp < 0xffffffff80000000 )
{
  rd = 0x80000000;
  OVF = 1;
}
else
{
  rd = temp;
}
```

The modified instruction set implemented within the MDB 210 may comprise shifting the value in a MIPS register rt left by the shift value in a MIPS register rs (SLAVS) unmodified instruction. The format of the instruction may be "SLAVS rd, rs, rt," where rd, rs, ad rt may be MIPS registers within the core processor 202. If overflow occurs, the result may be saturated to the maximum 32-bit integer 0x7fffffff. If underflow occurs, the result may be saturated to the minimum 32-bit integer 0x80000000. The shift count in register rs may be a 32-bit signed two's complement number. A negative shift value may correspond to a right shift of register rt. The sticky overflow bit may be set on any case of overflow or underflow. The following pseudo code may be utilized to implement the SLAVS instruction within the core processor 202:

```
/* temp is 32 bits */
if ( rs <= 0 )
{
  rd = rt >> (–rs);
}
else
{
  temp = rt;
  for ( i = 0; i < rs; i++ )
  {
    if ( temp > 0x3fffffff )
    {
      temp = 0x7fffffff;
      OVF = 1;
      break;
    }
    else if ( temp < 0xc0000000 )
    {
      temp = 0x80000000;
      OVF = 1;
      break;
    }
    temp = temp << 1;
  }
  rd = temp;
}
```

The modified instruction set implemented within the MDB 210 may comprise shifting a value in a MIPS register rt left by the shift amount specified by the immediate value sa (SLAS) unmodified instruction. The format of the instruction may be "SLAS rd, rs, rt," where rd, rs and rt may be MIPS registers within the core processor 202. If overflow occurs, the result may be saturated to the maximum 32-bit integer 0x7fffffff. If underflow occurs, the result may be saturated to the minimum 32-bit integer 0x80000000. The shift amount, sa, may be a positive number between 0 and 31 inclusive. The sticky overflow bit may be set on any case of overflow or underflow. The following pseudo code may be utilized to implement the SLAS instruction within the core processor 202:

```
/* temp is 32 bits */
temp = rt;
for ( i = 0; i < sa; i++ )
{
  if ( temp > 0x3fffffff )
  {
    temp = 0x7fffffff;
    OVF = 1;
    break;
  }
  else if ( temp < 0xc0000000 )
  {
    temp = 0x80000000;
    OVF = 1;
    break;
  }
  temp = temp << 1;
}
rd = temp;
```

The modified instruction set implemented within the MDB 210 may comprise placing the absolute value of register value rt in register rd (ABSS) unmodified instruction. The format of the instruction may be "ABSS rd, rs, rt," where rd, rs, and rt may be MIPS registers within the core processor 202. If the value of rt is the minimum 32-bit integer (0x80000000) then the value returned may be the maximum 32-bit integer (0x7fffffff), and the sticky overflow bit may be set. The following pseudo code may be utilized to implement the ABSS instruction within the core processor 202:

```
if ( rt == 0x80000000 )
{
  rd = 0x7fffffff;
  OVF = 1;
}
else if ( rt < 0 )
{
  rd = -rt;
}
else
{
  rd = rt;
}
```

The modified instruction set implemented within the MDB 210 may comprise moving the contents of a MIPS overflow register, OVF, to a general purpose MIPS register rd (MFOVF) unmodified instruction. The format of the instruction may be "MFOVF rd, rs, rt," where rd, rs, and rt may be MIPS registers within the core processor 202. Bit 0 of the OVF register may be the sticky overflow bit. The overflow bit may be set to 1 if an overflow condition has previously been set, by abss, adds, subs, maddsll, maddslh, maddshl, maddshh, msubsll, msubslh, msubshl, msubshh, slas or slavs instructions for example, or if it has been set to 1 using a mtovf instruction. The overflow bit may remain set until it is cleared using the mtovf instruction, for example. An exception may not be generated when the overflow bit in the OVF register is set. The following pseudo code may be utilized to implement the MFOVF instruction within the core processor 202:

```
rd=OVF;
```

The modified instruction set implemented within the MDB 210 may comprise moving the contents of a MIPS general purpose register rt to a MIPS overflow register, OVF (MTOVF) unmodified instruction. The format of the instruction may be "MTOVF rt," where rt may be a MIPS register within the core processor 202. The OVF register may contain one bit in position 0. Bit 0 of the OVF register may be a sticky overflow bit and may be set to 1 if an overflow condition has previously been set by the abss, adds, subs, maddsll, maddslh, maddshl, maddshh, msubsll, msubslh, msubshl, msubshh, slas or slavs instructions, for example. Bit 0 may also be set to 1 using the mtovf instruction. The overflow bit may remain set until it is cleared using the mtovf instruction. An exception may not be generated when the overflow bit in the OVF register is set. The following pseudo code may be utilized to implement the MFOVF instruction within the core processor 202:

```
OVF=rd & 0x1.
```

In another embodiment of the invention, the MDB 210 may implement a modified instruction set comprising a plurality of modified instructions. The plurality of modified instructions may be utilized to further accelerate digital signal processing of voice data by the core processor 202.

The modified instruction set implemented within the MDB 210 may comprise a saturate 64-bit result in a MIPS hi-lo register into 32 bits (SATHILO) modified instruction. If content of hi-lo is greater than 0x7fffffff, hi-lo may be saturated at 0x7fffffff. If content of hi-lo is less than 0xffffffff80000000, hi-lo may be saturated at 0xffffffff80000000. If either case is true, the overflow bit may be set. The following pseudo code may be utilized to implement the MFOVF instruction within the core processor 202:

```
/* hilo is 64 bits */
if ( hilo > 0x7fffffff )
{
  hilo = 0x7fffffff;
  OVF = 1;
}
else if ( hilo < 0xffffffff80000000 )
{
  hilo = 0xffffffff80000000;
  OVF = 1;
}
```

The modified instruction set implemented within the MDB 210 may comprise a dual multiply, accumulate and saturate to a MIPS hi/lo register pair (MADDS) modified instruction. The format of the instruction may be "MADDS rs, rt," where rs and rt may be MIPS registers within the core processor 202. Two sets of multiply, accumulate, and saturation operations may be performed. The first set may be performed between the low 16 bits of rs and the low 16 bits of rt whereas the second set may be performed between the high 16 bits of rs and the high 16 bits of rt. A left shift may be performed on the result of each multiplication before adding to the hi/lo pair. Furthermore, if the result of each multiplication is 0x40000000, the result of the left shift may be saturated to 0x7fffffff. If overflow or underflow occurs when adding each shifted multiplication result to the hi/lo pair, then each result may be saturated to the maximum or minimum signed 32-bit integer value (0x7fffffff or 0xffffffff80000000). The sticky overflow bit may be set on any case of overflow or underflow. The following pseudo code may be utilized to implement the MADDS instruction within the core processor 202:

```
/* temp1 is 32 bits */
/* hilo is 64 bits */
temp1 = rs.lo * rt.lo;
if ( temp1 == 0x40000000 )
{
   temp1 = 0x7fffffff;
   OVF = 1;
}
else
{
   temp1 = temp1 << 1;
}
hilo = hilo + temp1;
if ( hilo > 0x7fffffff )
{
   hilo = 0x7fffffff;
   OVF = 1;
}
else if ( hilo < 0xffffffff80000000 )
{
   hilo = 0xffffffff80000000;
   OVF = 1;
}
temp2 = rs.hi * rt.hi;
if ( temp2 == 0x40000000 )
{
   temp2 = 0x7fffffff;
   OVF = 1;
}
else
{
   temp2 = temp2 << 1;
}
hilo = hilo + temp2;
if ( hilo > 0x7fffffff )
{
   hilo = 0x7fffffff;
   OVF = 1;
}
else if ( hilo < 0xffffffff80000000 )
{
   hilo = 0xffffffff80000000;
   OVF = 1;
}
```

The modified instruction set implemented within the MDB 210 may comprise a dual multiply, accumulate and saturate to a MIPS hi/lo register pair (MADDSX) modified instruction. The format of the instruction may be "MADDSX rs, rt," where rs and rt may be MIPS registers within the core processor 202. Two sets of multiply, accumulate, and saturation operations may be performed. The first set may be performed between the low 16 bits of rs and the high 16 bits of rt whereas the second set may be performed between the high 16 bits of rs and the low 16 bits of rt. A left shift may be performed on the result of each multiplication before adding to the hi/lo pair. Furthermore, if the result of each multiplication is 0x40000000, the result of the left shift may be saturated to 0x7fffffff. If overflow or underflow occurs when adding each shifted multiplication result to the hi/lo pair, then each result may be saturated to the maximum or minimum signed 32-bit integer value (0x7fffffff or 0xffffffff80000000). The sticky overflow bit may be set on any case of overflow or underflow. The following pseudo code may be utilized to implement the MADDSX instruction within the core processor 202:

```
/* temp1 is 32 bits */
/* hilo is 64 bits */
temp1 = rs.lo * rt.hi;
if ( temp 1 == 0x40000000 )
{
   temp1 = 0x7fffffff;
   OVF = 1;
}
else
{
   temp1 = temp1 << 1;
}
hilo = hilo + temp1;
if ( hilo > 0x7fffffff )
{
   hilo = 0x7fffffff,
   OVF = 1;
}
else if ( hilo < 0xffffffff80000000 )
{
   hilo = 0xffffffff80000000;
   OVF = 1;
}
temp2 = rs.hi * rt.lo;
if ( temp2 == 0x40000000 )
{
   temp2 = 0x7fffffff;
   OVF = 1;
}
else
{
   temp2 = temp2 << 1;
}
hilo = hilo + temp2;
if ( hilo > 0x7fffffff )
{
   hilo = 0x7fffffff;
   OVF = 1;
}
else if ( hilo < 0xffffffff80000000 )
{
   hilo = 0xffffffff80000000;
   OVF = 1;
}
```

The modified instruction set implemented within the MDB 210 may comprise a dual multiply and accumulate to a MIPS hi/lo register pair (MADDD) modified instruction. The format of the instruction may be "MADDD rs, rt," where rs and rt may be MIPS registers within the core processor 202. Two sets of multiply, and add operations may be performed. The first set may be performed between the low 16 bits of rs and the low 16 bits of rt. The second instruction set may be performed between the high 16 bits of rs and the high 16 bits of rt without a left shift of the product before each accumulation and without saturation on overflow logic, for example. The following pseudo code may be utilized to implement the MADDD instruction within the core processor 202:

```
/* hilo is 64 bits */
hilo = hilo + (rs.lo * rt.lo) + (rs.hi * rt.hi);
```

The modified instruction set implemented within the MDB 210 may comprise a dual multiply and accumulate to a MIPS hi/lo register pair (MADDDX) modified instruction. The format of the instruction may be "MADDDX rs, rt," where rs and rt may be MIPS registers within the core processor 202. Two sets of multiply, and add operations may be performed. The first set may be performed between the low 16 bits of rs and the high 16 bits of rt. The second instruction set may be performed between the high 16 bits of rs and the low 16 bits of rt without a left shift of the product before each accumulation and without saturation on overflow logic, for example. The following pseudo code may be utilized to implement the MADDDX instruction within the core processor 202:

```
/* hilo is 64 bits */
hilo = hilo + (rs.lo * rt.hi) + (rs.hi * rt.lo);
```

The system control coprocessor (SCC) 212 may comprise suitable circuitry, logic, and/or code and may be adapted to manage and display the status of hardware resources in the core processor 202. For example, the SCC 212 may provide exception detection and generation, diagnostic functionalities for the core processor 202, operating mode selection (kernel versus user mode, for example), processor identification, timer, and/or enabling and disabling of interrupts. Configuration information, such as cache size and set associativity, TLB sizes, and EJTAG debug features, may be stored in one or more configuration registers within the SCC 212.

The debug support block 214 may comprise suitable circuitry, logic, and/or code and may be utilized to provide standard Enhanced Joint Test Action Group (EJTAG) emulator support via the EJTAG port 226 and the bus 228. The debug support block 214 may be compliant with the MIPS EJTAG 2.0[3] specification, for example, and may provide debugging functionalities, such as a debug mode, run control, single stepping and software breakpoint instruction (SDBBP). Furthermore, the debug support block 214 may provide hardware debugging support of two of each instruction, data, and data value hardware breakpoints, for example. In one aspect of the invention, the hardware instruction breakpoints may be configured to generate a debug exception at one or more instructions in the virtual address space within the core processor 202. Bit mask values may be applied during the address compare. Data breakpoints within the debug support block 214 may be configured to generate a debug exception on a data transaction, which may be qualified with virtual address, data value, size, and/or load/store transaction type.

The memory management unit (MMU) with a translation lookaside buffer (TLB) 206 may comprise suitable circuitry, logic, and/or code and may be utilized for virtual-to-physical address translation, memory protection among active applications, and/or cache attributes for the memory locations. In one embodiment of the invention, address space for the core processor 202 may be partitioned into four memory segments, for example. In this regard, the MMU 206 may utilize fixed mapping and/or page-based mapping for memory management within the core processor 202. For example, the TLB within the MMU 206 may be utilized to store recently translated memory pages that were mapped utilizing page-based mapping. In this regard, the TLB may comprise 32 entries, for example, and each entry may be adapted to store translation information of a virtual page with its even half mapped to a physical page and its odd half mapped to another virtual page. In another embodiment of the invention, the MMU 206 may be adapted to determine cache attribute of memory locations in a memory page, for TLB-based translation, and in a segment, for fixed memory mapping within the core processor 202.

The instruction cache 208 may comprise suitable circuitry, logic, and/or code and may be virtually indexed and physically tagged when utilized to cache processing instructions within the core processor 202. Cache access and translation within the instruction cache 208 may take place in parallel. The instruction cache 208 may comprise two-way set associative cache with a line size of 16 bytes, for example. Each cache set may use a least recently used (LRU) algorithm to replace a cache line by an incoming line. Furthermore, the instruction cache 208 may provide cache control via cache locking, which may allow critical code, such as interrupt handler, for example, to be locked in the instruction cache 208 on a per-line basis. Entries within the instruction cache 208 may be marked as locked using the fetch and lock command of the CACHE instruction, for example. Even though cache line size of 16 bytes is disclosed, the present invention may not be so limited and other cache line sizes may also be utilized within the instruction cache 208.

The data cache 216 may comprise suitable circuitry, logic, and/or code and may be adapted to store data, such as voice data, during data processing by the core processor 202. The data cache 216 may be virtually indexed and physically tagged, which may allow for parallel cache access and translation within the core processor 202. The data cache 216 may comprise two-way set associative cache with a line size of 16 bytes, for example. Each cache set may use a least recently used (LRU) algorithm to replace a cache line by an incoming line. Furthermore, the data cache 216 may provide cache control via cache locking, which may allow critical data to be locked in the data cache 216 on a per-line basis. Entries within the data cache 216 may be marked as locked using the fetch and lock command of the CACHE instruction, for example. Even though cache line size of 16 bytes is disclosed, the present invention may not be so limited and other cache line sizes may also be utilized within the data cache 216.

The bus interface unit (BIU) 218 may comprise suitable circuitry, logic, and/or code and may be adapted to buffer unprocessed data for processing within the core processor 202. The unprocessed data, such as voice data, may be communicated to the BIU 218 via the system bus 228 and the interface 224. Similarly, the BIU 218 may also be adapted to buffer processed data, such as voice data processed by the core processor 202, prior to communicating such processed data outside the core processor 202 for further processing. The BIU 218 may comprise readahead cache 220. The readahead cache 220 may comprise suitable circuitry, logic, and/or code and may be physically indexed and tagged. The readahead cache 220 may utilized a least recently used (LRU) replacement algorithm and may be adapted to pre-fetch and stage memory blocks ahead of applying any core processor modified and/or unmodified instructions.

Figure 3:
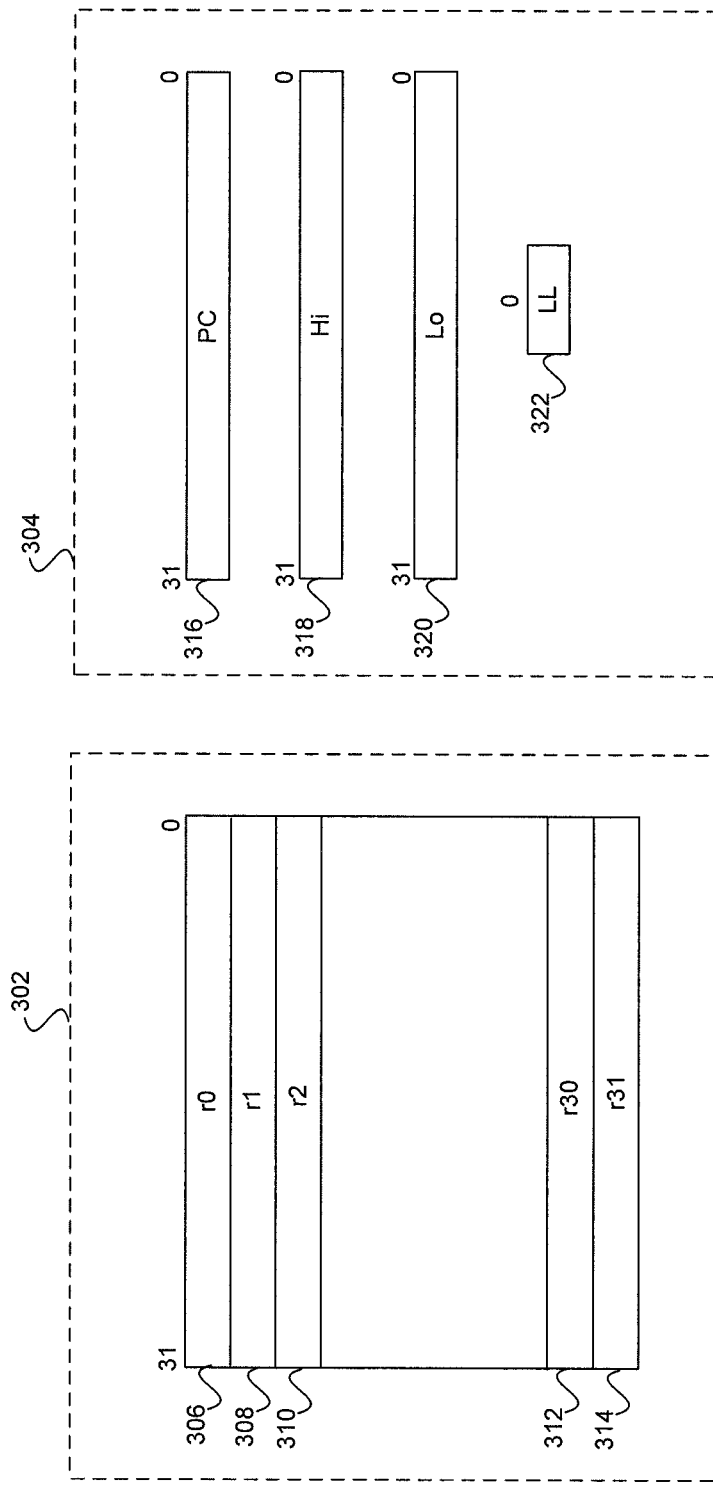
FIG. 3 is a block diagram of processor core registers that may be utilized by the exemplary processor core of FIG. 2, for example, in accordance with an embodiment of the invention.

FIG. 3 is a block diagram of processor core registers that may be utilized by the exemplary processor core of FIG. 2, for example, in accordance with an embodiment of the invention. Referring to FIG. 3, a core processor with modified instruction set for processing voice data, such as the core processor 202 in FIG. 2, may utilize a general purpose register block 302 and/or a special register block 304 during processing of voice data, for example.

The general-purpose register block 302 may comprise a plurality of general purpose registers. In one embodiment of the invention, the general purpose register block 302 may comprise thirty-two general purpose registers 306, . . . , 314, and each of the general purpose registers may be 32 bits wide. General-purpose register 0, 306, may contain a hard coded value of 0x0000_0000, for example. General-purpose register 31, 314, may be utilized as a link register. In this regard, the general-purpose register 31 may be updated by a Jump and Link (JAL) instruction, during processing of data by the core processor 202. Even though the general-purpose register block 302 comprises thirty-two 32-bit wide registers, the present invention may not be so limited. In this regard, a general-purpose register block within a single core processor utilizing a modified instruction set for processing voice data may comprise a different number of general-purpose registers with width other than 32 bits.

The special register block 304 may comprise one or more special registers. For example, the special register block 304 may comprise a program counter register 316, a HI register 318, a LO register 320, and an LL register 322. The program counter register 316 may comprise a 32-bit program counter (PC) register, which may be utilized to store an address of a current modified or unmodified core processor instruction. The HI register 318 and the LO register 320 may comprise suitable circuitry, logic, and/or code and may be adapted to store results of integer multiply, divide, accumulate, and/or multiply operations during processing of data by the single core processor with modified instruction set. In one aspect of the invention, the HI and LO registers 318 and 320 may comprise 32-bit registers. The LL register 322 may be a 1-bit load linked register, which may be utilized to store the result of an LL-SC instruction pair during of processing of data by the single core processor with modified instruction set.

Figure 4:
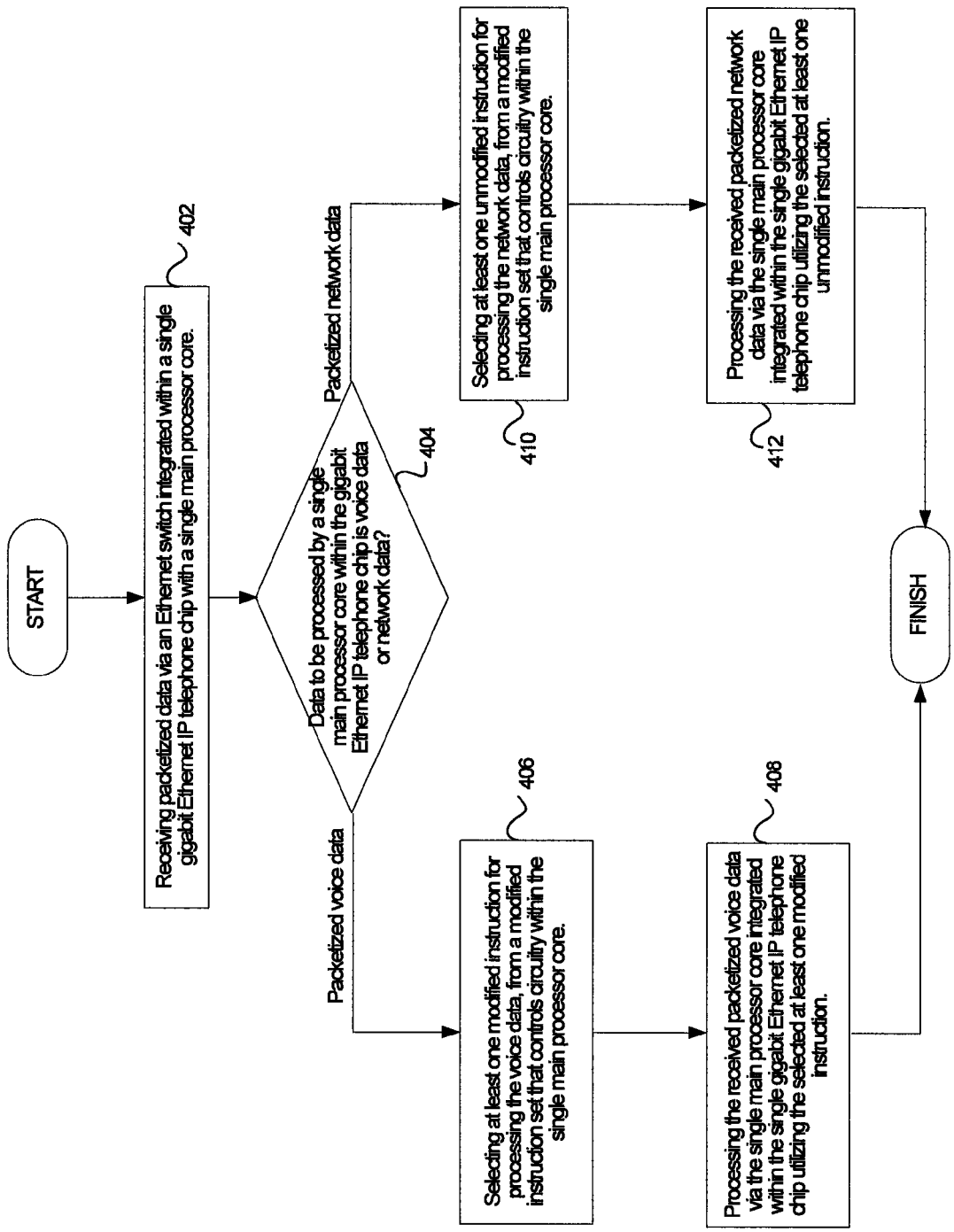
FIG. 4 is a flow diagram illustrating exemplary steps for processing Ethernet data, in accordance with an embodiment of the invention.

FIG. 4 is a flow diagram illustrating exemplary steps for processing Ethernet data, in accordance with an embodiment of the invention. Referring to FIG. 4, at 402, packetized data may be received via an Ethernet switch integrated within a single gigabit Ethernet IP telephone chip with a single main processor core. At 404, it may be determined whether data to be processed by the single main processor core within the gigabit Ethernet IP telephone chip is voice data or network data. If it is determined that data to be processed by the single main processor core within the gigabit Ethernet IP telephone chip is packetized voice data, at 406, one or more modified instructions may be selected for processing the voice data, from a modified instruction set that controls circuitry within the single main processor core. At 408, the received packetized voice data may be processed via the single main processor core integrated within the single gigabit Ethernet IP telephone chip utilizing one or more of the selected modified instructions. If it is determined that data to be processed by the single main processor core within the gigabit Ethernet IP telephone chip is packetized network data, at 410, one or more unmodified instructions may be selected for processing the network data, from the modified instruction set that controls circuitry within the single main processor core. At 412, the received packetized network data may be processed via the single main processor core integrated within the single gigabit Ethernet IP telephone chip utilizing the selected one or more unmodified instructions.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing data, the method comprising:
performing by one or more processors, circuits, or a combination thereof integrated within a single gigabit Ethernet IP phone chip, wherein said one or more processors, circuits, or a combination thereof comprise an Ethernet switch and a single main processor core:
processing packetized network data by said single main processor core utilizing a first instruction set; and
processing without utilizing a separate DSP, packetized voice data for a plurality of voice channels by said single main processor core utilizing a second instruction set, wherein said second instruction set is a modified version of said first instruction set.

2. The method according to claim 1, comprising receiving said packetized network data and said packetized voice data for said plurality of voice channels by said Ethernet switch.

3. The method according to claim 1, comprising determining whether data to be processed by said single main processor core comprises said packetized voice data or said packetized network data.

4. The method according to claim 1, comprising when said data to be processed by said single main processor core comprises said packetized voice data, selecting at least one instruction from said second instruction set for said processing of said packetized voice data.

5. The method according to claim 1, comprising, when said data to be processed by said single main processor core comprises said packetized network data, selecting at least one instruction from said first instruction set for said processing of said packetized network data.

6. The method according to claim 1, comprising executing at least one instruction from said second instruction set by said single main processor core for said processing of said packetized voice data for said plurality of voice channels.

7. The method according to claim 1, comprising executing at least one instruction from said first instruction set by said single main processor core for said processing of said packetized network data.

8. The method according to claim 1, wherein said second instruction set comprises at least one instruction, which when executed by said single main processor core, processes said packetized voice data without having to use a DSP within said single gigabit Ethernet IP phone chip.

9. The method according to claim 1, wherein said single main processor core comprises a reduced instruction set computing (RISC) processor core.

10. The method according to claim 1, wherein said second instruction set comprises one or more of a multiply-add instruction, a multiply-subtract instruction, a saturate instruction, a multiply-add-shift-saturate instruction for said processing of said packetized voice data for said plurality of voice channels, or a combination thereof.

11. The method according to claim 1, wherein said second instruction set comprises a saturate 64-bit result in million-instructions-per-second (MIPS) hi-lo register into 32 bits (SATHILO) instruction, wherein:
when content of said MIPS hi-lo register is greater than 0x7fffffff, saturating said MIPS hi-lo register at 0x7fffffff, and setting an overflow bit; and
when content of said MIPS hi-lo register is less than 0xffffffff80000000, saturating said MIPS hi-lo register at 0xffffffff80000000, and setting said overflow bit.

12. The method according to claim 1, wherein said second instruction set comprises a dual multiply, accumulate and saturate to a MIPS hi/lo register pair (MADDS) instruction, in which two sets of multiply, accumulate, and saturation operations are performed by said MADDS instruction, wherein:
a first of said two sets of multiply, accumulate, and saturate operations is performed between low 16 bits of a MIPS rs register and low 16 bits of a MIPS rt register; and
a second of said two sets of multiply, accumulate, and saturate operations is performed between high 16 bits of said MIPS rs register and high 16 bits of said MIPS rt register,
wherein:
results of said two sets of multiply are left shifted prior to addition to said MIPS hi/lo register pair;
results of said left shift is saturated to 0x7fffffff if a result of each said two sets of multiply is 0x40000000;
if overflow or underflow occurs when adding each left shifted multiplication result to said MIPS hi/lo register pair, each result is saturated to a maximum or a minimum signed 32-bit integer value of 0x7fffffff or 0xffffffff80000000; and
an overflow bit is set if said overflow or said underflow occurs.

13. The method according to claim 1, wherein said second instruction set comprises a dual multiply, accumulate and saturate to the MIPS hi/lo register pair (MADDDSX) instruction, in which two sets of multiply, accumulate, and saturation operations are performed by said MADDDSX instruction, wherein:
a first of said two sets of multiply, accumulate and saturate operations is performed between low 16 bits of a MIPS rs register and high 16 bits of a MIPS rt register; and
a second of said two sets of multiply, accumulate and saturate operations is performed between high 16 bits of said MIPS rs register and the low 16 bits of said MIPS rt register,
wherein:
results of said two sets of multiply are left shifted prior to addition to said MIPS hi/lo register pair;
results of said left shift is saturated to 0x7fffffff if a result of each multiplication is 0x40000000;
when overflow or underflow occurs when adding each shifted multiplication result to said MIPS hi/lo pair, then each result is saturated to a maximum or a minimum signed 32-bit integer value of 0x7fffffff or 0xffffffff80000000; and
an overflow bit is set if said overflow or said underflow occurs.

14. The method according to claim 1, wherein said second instruction set comprises a dual multiply and accumulate to a MIPS hi/lo register pair (MADDD) instruction, in which two sets of multiply and add operations are performed by said MADDD instruction, wherein:
a first of said two sets of multiply and add operations is performed between low 16 bits of a MIPS rs register and low 16 bits of a MIPS rt register; and
a second of said two sets of multiply and add operations is performed between high 16 bits of said MIPS rs register and high 16 bits of said MIPS rt register.

15. The method according to claim 1, wherein said second instruction set comprises a dual multiply and accumulate to the hi/lo register pair (MADDOX) instruction, in which two sets of multiply and add operations are performed by said MADDOX instruction, wherein:
a first of said two sets of multiply and add operations is performed between low 16 bits of a MIPS rs register and high 16 bits of MIPS rt register; and
a second of said two sets of multiply and add operations is performed between high 16 bits of said MIPS rs register and low 16 bits of said MIPS rt register.

16. A system for processing data, the system comprising:
one or more processors, circuits, or a combination thereof integrated within a single gigabit Ethernet IP phone chip, wherein said one or more processors, circuits, or a combination thereof circuits comprise an Ethernet switch and a single main processor core, and said one or more processors, circuits, or a combination thereof are operable to:
process packetized network data by said single main processor core utilizing a first instruction set; and
process without utilizing a separate DSP, packetized voice data for a plurality of voice channels by said single main processor core utilizing a second instruction set, wherein said second instruction set is a modified version of said first instruction set.

17. The system according to claim 16, wherein said one or more processors, circuits, or a combination thereof are operable to receive said packetized network data and said packetized voice data for said plurality of voice channels by said Ethernet switch.

18. The system according to claim 16, wherein said one or more processors, and/or circuits, or a combination thereof are operable to determine whether data to be processed by said single main processor core comprises said packetized voice data or said packetized network data.

19. The system according to claim 16, wherein said one or more processors, circuits, or a combination thereof are operable to select at least one instruction from said second instruction set for said processing of said packetized voice data, when said data to be processed by said single main processor core comprises said packetized voice data.

20. The system according to claim 16, wherein said one or more processors, circuits, or a combination thereof are operable to select at least one instruction from said first instruction set for said processing of said packetized network data, when said data to be processed by said single main processor core comprises said packetized network data.

21. The system according to claim 16, wherein said one or more processors, circuits, or a combination thereof are operable to execute at least one instruction from said second instruction set by said single main processor core for said processing of said packetized voice data for said plurality of voice channels.

22. The system according to claim 16, wherein said one or more processors, circuits, or a combination thereof are operable to execute at least one instruction from said first instruction set by said single main processor core for said processing of said packetized network data.

23. The system according to claim 16, wherein said second instruction set comprises at least one instruction, which when executed by said single main processor core, processes said packetized voice data without having to use a DSP within said single gigabit Ethernet IP phone chip.

24. The system according to claim 16, wherein said single main processor core comprises a reduced instruction set computing (RISC) processor core.

25. The system according to claim 16, wherein said second instruction set comprises one or more of a multiply-add instruction, a multiply-subtract instruction, a saturate instruction, a multiply-add-shift-saturate instruction for said processing of said packetized voice data for said plurality of voice channels, or a combination thereof.

26. The system according to claim 16, wherein said second instruction set comprises a saturate 64-bit result in million-instructions-per-second (MIPS) hi-lo register into 32 bits (SATHILO) instruction, wherein:
 when content of said MIPS hi-lo register is greater than 0x7fffffff, saturating said MIPS hi-lo register at 0x7fffffff, and setting an overflow bit; and
 when content of said MIPS hi-lo register is less than 0xffffffff80000000, saturating said MIPS hi-lo register at 0xffffffff80000000, and setting said overflow bit.

27. The system according to claim 16, wherein said second instruction set comprises a dual multiply, accumulate and saturate to a MIPS hi/lo register pair (MADDS) instruction, in which two sets of multiply, accumulate, and saturation operations are performed by said MADDS instruction, wherein:
 a first of said two sets of multiply, accumulate, and saturate operations is performed between low 16 bits of a MIPS rs register and low 16 bits of a MIPS rt register; and
 a second of said two sets of multiply, accumulate, and saturate operations is performed between high 16 bits of said MIPS rs register and high 16 bits of said MIPS rt register,
 wherein:
 results of said two sets of multiply are left shifted prior to addition to said MIPS hi/lo register pair;
 results of said left shift is saturated to 0x7fffffff if a result of each said two sets of multiply is 0x40000000;
 if overflow or underflow occurs when adding each left shifted multiplication result to said MIPS hi/lo register pair, each result is saturated to a maximum or a minimum signed 32-bit integer value of 0x7fffffff or 0xffffffff80000000; and
 an overflow bit is set if said overflow or said underflow occurs.

28. The system according to claim 16, wherein said second instruction set comprises a dual multiply, accumulate and saturate to the MIPS hi/lo register pair (MADDDSX) instruction, in which two sets of multiply, accumulate, and saturation operations are performed by said MADDDSX instruction, wherein:
 a first of said two sets of multiply, accumulate and saturate operations is performed between low 16 bits of a MIPS rs register and high 16 bits of a MIPS rt register; and
 a second of said two sets of multiply, accumulate and saturate operations is performed between high 16 bits of said MIPS rs register and the low 16 bits of said MIPS rt register,
 wherein:
 results of said two sets of multiply are left shifted prior to addition to said MIPS hi/lo register pair;
 results of said left shift is saturated to 0x7fffffff if a result of each multiplication is 0x40000000;
 when overflow or underflow occurs when adding each shifted multiplication result to said MIPS hi/lo pair, then each result is saturated to a maximum or a minimum signed 32-bit integer value of 0x7fffffff or 0xffffffff80000000; and
 an overflow bit is set if said overflow or said underflow occurs.

29. The system according to claim 16, wherein said second instruction set comprises a dual multiply and accumulate to a MIPS hi/lo register pair (MADDD) instruction, in which two sets of multiply and add operations are performed by said MADDD instruction, wherein:
 a first of said two sets of multiply and add operations is performed between low 16 bits of a MIPS rs register and low 16 bits of a MIPS rt register; and
 a second of said two sets of multiply and add operations is performed between high 16 bits of said MIPS rs register and high 16 bits of said MIPS rt register.

30. The system according to claim 16, wherein said second instruction set comprises a dual multiply and accumulate to the hi/lo register pair (MADDOX) instruction, in which two sets of multiply and add operations are performed by said MADDOX instruction, wherein:
 a first of said two sets of multiply and add operations is performed between low 16 bits of a MIPS rs register and high 16 bits of MIPS rt register; and
 a second of said two sets of multiply and add operations is performed between high 16 bits of said MIPS rs register and low 16 bits of said MIPS rt register.

* * * * *